(12) United States Patent
Alvarez-Melis et al.

(10) Patent No.: US 11,709,806 B2
(45) Date of Patent: Jul. 25, 2023

(54) GRADIENT FLOWS IN DATASET SPACE

(71) Applicant: Microsoft Technology Licensing, LLC, Redmond, WA (US)

(72) Inventors: David Alvarez-Melis, Boston, MA (US); Nicolo Fusi, Watertown, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/103,290

(22) Filed: Nov. 24, 2020

(65) Prior Publication Data
US 2022/0092037 A1 Mar. 24, 2022

Related U.S. Application Data

(60) Provisional application No. 63/083,009, filed on Sep. 24, 2020, provisional application No. 63/091,837, filed on Oct. 14, 2020.

(51) Int. Cl.
| | |
|---|---|
| *G06F 16/21* | (2019.01) |
| *G06N 20/10* | (2019.01) |
| *G06N 7/02* | (2006.01) |
| *G06N 20/00* | (2019.01) |
| *G06N 7/01* | (2023.01) |
| *G06Q 10/10* | (2023.01) |
| *G06Q 50/26* | (2012.01) |

(52) U.S. Cl.
CPC .............. *G06F 16/211* (2019.01); *G06N 7/01* (2023.01); *G06N 20/00* (2019.01); *G06Q 10/10* (2013.01); *G06Q 50/26* (2013.01)

(58) Field of Classification Search
CPC .... G06F 16/211; G06F 16/172; G06F 16/182; G06F 11/1469; G06F 2201/80; G06F 16/176; G06F 21/575; G06F 21/606; G06N 20/00; G06N 7/005
USPC ......................................................... 707/803
See application file for complete search history.

(56) References Cited

U.S. PATENT DOCUMENTS

| | | | |
|---|---|---|---|
| 10,942,954 B2 * | 3/2021 | Martinez Iraola .. | G06F 16/3329 |
| 11,137,987 B2 * | 10/2021 | Namarvar ........... | G06F 16/2322 |
| 11,238,278 B1 * | 2/2022 | Swanson ............. | G06V 30/412 |
| 2018/0260416 A1 * | 9/2018 | Elkaim .................. | G06F 16/58 |
| 2019/0155991 A1 * | 5/2019 | Li .......................... | G16H 50/20 |

(Continued)

OTHER PUBLICATIONS

Achille, et al., "Dynamics and Reachability of Learning Tasks", In Repository of arXiv:1810.02440v2, May 29, 2019, 09 Pages.

(Continued)

*Primary Examiner* — Kuen S Lu
(74) *Attorney, Agent, or Firm* — Schwegman Lundberg & Woessner, P.A.

(57) ABSTRACT

Generally discussed herein are devices, systems, and methods for machine learning (ML) by flowing a dataset towards a target dataset. A method can include receiving a request to operate on a first dataset including first feature, label pairs, identifying a second dataset from multiple datasets, the second dataset including second feature, label pairs, determining a distance between the first feature, label and the second feature, label pairs, and flowing the first dataset using a dataset objective that operates based on the determined distance to generate an optimized dataset.

17 Claims, 10 Drawing Sheets

(56) References Cited

U.S. PATENT DOCUMENTS

| | | | |
|---|---|---|---|
| 2021/0027141 A1* | 1/2021 | MacAvaney | G06V 10/768 |
| 2021/0064507 A1* | 3/2021 | Chakra | G06N 7/005 |

OTHER PUBLICATIONS

Alvarez-Melis, et al., "Geometric Dataset Distances via Optimal Transport", In Repository of arXiv:2002.02923, Feb. 7, 2020, 14 Pages.

Amodei, et al., "AI and Compute", Retrieved from: https://openai.com/blog/ai-and-compute/, May 16, 2018, 07 Pages.

Arbel, et al., "Maximum Mean Discrepancy Gradient Flow", In Proceedings of Annual Conference on Neural Information Processing Systems, Dec. 8, 2019, 11 Pages.

Benamou, et al., "A Computational Fluid Mechanics Solution to the Monge-Kantorovich Mass Transfer Problem", In Journal of Numerische Mathematik, vol. 84, Issue 3, Jan. 2000, pp. 375-393.

Carrillo, et al., "A Blob Method for Diffusion", In Journal of Calculus of Variations and Partial Differential Equations, vol. 58, Issue 2, Apr. 2019, 53 Pages.

Carrillo, et al., "Aggregation-Diffusion Equations: Dynamics, Asymptotics, and Singular Limits", arXiv:1810.03634v1 [math.AP], Oct. 8, 2018, 43 Pages.

Carrillo, et al., "Contractivity of Wasserstein Metrics and Asymptotic Profiles for Scalar Conservation Laws", In Journal of Differential Equations, vol. 231, issue 2, Dec. 15, 2006, pp. 425-458.

Carrillo, et al., "Numerical Study of a Particle Method for Gradient Flows", In Repository of arXiv: 1512.03029v3, Dec. 6, 2016, 27 Pages.

Chizat, et al., "On the Global Convergence of Gradient Descent for Over-parameterized Models using Optimal Transport", In Proceedings of Annual Conference on Neural Information Processing Systems, Dec. 3, 2018, 11 Pages.

Chizat, Lenaic, "Sparse Optimization on Measures with Over-parameterized Gradient Descent", In Repository of arXiv:1907.1030, Jul. 24, 2019, 40 Pages.

Clanuwat, et al., "Deep Learning for Classical Japanese Literature", In Repository of arXiv: 1812.01718, Dec. 3, 2018, 08 Pages.

Courty, et al., "Optimal Transport for Domain Adaptation", In Journal of IEEE Transactions on Pattern Analysis and Machine Intelligence, vol. 39, Issue 9, Sep. 1, 2017, pp. 1853-1865.

Cubuk, et al., "AutoAugment: Learning Augmentation Strategies from Data", in Proceedings of the IEEE Conference on Computer Vision and Pattern Recognition, Jun. 15, 2019, pp. 113-123.

Damodaran, et al., "DeepJDOT: Deep Joint Distribution Optimal Transport for Unsupervised Domain Adaptation", In Proceedings of the European Conference on Computer Vision, Sep. 8, 2018, 17 Pages.

Dao, et al., "A Kernel Theory of Modern Data Augmentation", In Proceedings of the 36th International Conference on Machine Learning, Jun. 9, 2019, 36 Pages.

Dinh, et al., "Density Estimation Using Real NVP", In Repository of arXiv:1605.08803v3, Feb. 27, 2017, 32 Pages.

Dinh, et al., "NICE: Non-linear Independent Components Estimation", In Repository of arXiv:1410.8516, Oct. 30, 2014, 12 Pages.

Finn, et al., "Model-Agnostic Meta-Learning for Fast Adaptation of Deep Networks", In Proceedings of the 34th International Conference on Machine Learning, vol. 70, Jul. 18, 2017, 10 Pages.

Germain, et al., "MADE: Masked Autoencoder for Distribution Estimation", In Proceedings of the 32nd International Conference on Machine Learning, Jun. 1, 2015, 09 Pages.

Huang, et al., "Error Estimate of a Random Particle Blob Method for the Keller-Segei Equation", In Journal of Mathematics of Computation, vol. 86, Issue 308, Feb. 15, 2017, pp. 2719-2744.

Hull, Jonathanj. , "A Database for Handwritten Text. Recognition Research", In Journal of IEEE Transactions on Pattern Analysis and Machine Intelligence, vol. 16, Issue 5, May 1994, pp. 550-554.

Iyer, et al., "Submoduiar Optimization with Submodular Cover and Submodular Knapsack Constraints", In Proceedings of 27th Annual Conference on Neural Information Processing Systems, Dec. 5, 2013, 09 Pages.

Javanmard, et al., "Analysis of a Two-Layer Neural Network via Displacement Convexity", In Repository of arXiv:1901.01375, Jan. 5, 2019, 54 Pages.

Jordan, et al., "The Variational Formulation of the Fokker-Planck Equation", In SIAM Journal on Mathematical Analysis, vol. 29, Issue 1, Jan. 1998, 26 Pages.

Kac, M, "Foundations of Kinetic Theory", In Proceedings of the Third Berkeley Symposium on Mathematical Statistics and Probability, 1956, pp. 171-197.

Kingma, et al., "Glow: Generative Flow with Invertible 1×1 Convolutions", In Proceedings of Annual Conference on Neural Information Processing Systems, Dec. 3, 2018, 10 Pages.

Kolouri, et al., "Generalized Sliced Distances for Probability Distributions", In Repository of arXiv:2002.12537, Feb. 28, 2020, 15 Pages.

Krizhevsky, et al., "ImageNet Classification with Deep Convolutional Neural Networks", In Proceedings of 26th Annual Conference on Neural Information Processing Systems, Dec. 3, 2012, 9 Pages.

Lecun,"The MNIS Handwritten Digit Database", Retrieved from: http://yann.lecun.com/exdb/mnist/, Retrieved Date: Nov. 12, 2020, 07 Pages.

Lin, et al., "How to Select a Good Training-data Subset for Transcription: Submoduiar Active Selection for Sequences", In Proceedings of the Annual Conference of the International Speech Communication Association, Sep. 2009, 04 Pages.

Liu, et al., "A Random Particle Blob Method for the Keller-Segel Equation and Convergence Analysis", In Journal of Mathematics of Computation, vol. 86, Issue 304, Mar. 2017, pp. 725-745.

Liutkus, et al., "Sliced-Wasserstein Flows: Nonparametric Generative Modeling via Optimal Transport and Diffusions", In Proceedings of the 36th International Conference on Machine Learning, May 24, 2019, 10 Pages.

Mosier, et al., "Automation Bias: Decision Making and Performance in High-Tech Cockpits", In the International Journal of Aviation Psychology, vol. 8, Issue 1, 1998, pp. 47-63.

Otto, Felix, "The geometry of dissipative evolution equations: the porous medium equation", In Journal of Communications in Partial Differential Equations, vol. 26, Issue 1-2, 2001, 75 Pages.

Papamakarios, "Masked Autoregressive Flow for Density Estimation", In Proceedings of the 31st International Conference on Neural Information Processing Systems, Dec. 4, 2017, 10 Pages.

Santambrogio, Filippo, "{Euclidean, metric, and Wasserstein} gradient flows: an overview", In Bulletin of Mathematical Sciences, vol. 7, Issue 1, Apr. 2017, pp. 87-154.

Santambrogio, Filippo, "Optimal Transport for Applied Mathematicians", In Publication of Birkhauser, 2015, 239 Pages.

Scieur, "integration Methods and Optimization Algorithms", In Proceedings of Annual Conference on Neural Information Processing Systems, Dec. 4, 2017, 10 Pages.

Seguy, et al., "Large-Scale Optimal Transport and Mapping Estimation", In Proceedings of 6th International Conference on Learning Representations, Apr. 30, 2018, 15 Pages.

Serrano, et al., "Principled Data Preprocessing: Application to Biological Aquatic Indicators of Water Pollution", In Proceedings of 28th International Workshop on Database and Expert Systems Applications, Aug. 28, 2017, pp. 52-56.

Simard, et al., "Best practices for convolutional neural networks applied to visual document analysis", In Proceedings of 7th International Conference on Document Analysis and Recognition, Aug. 3, 2003, 6 Pages.

Strubell, et al., "Energy and Policy Considerations for Deep Learning in NLP", In Proceedings of the 57th Annual Meeting of the Association for Computational Linguistics, Jul. 28, 2019, pp. 3645-3650.

Su, et al., "A Differential Equation for Modeling Nesterov's Accelerated Gradient Method: Theory and Insights", In the Journal of Machine Learning Research, vol. 17, Sep. 2016, 43 Pages.

(56) References Cited

OTHER PUBLICATIONS

Tramer, et al., "Stealing Machine Learning Models via Prediction APIs", In Proceedings of the USENIX Security Symposium, Aug. 10, 2016, pp. 601-618.
Villani, Cedric, "Optimal Transport: Old and New", In Publication of Springer, Jun. 13, 2008, 998 Pages.
Wilson, et al., "A. Lyapunov Analysis of Momentum Methods in Optimization", In Repository of arXiv:1611.0263, Nov. 9, 2016, 43 Pages.
Wu, et al., "Phase Transitions for the Information Bottleneck in Representation Learning", In Proceedings of International Conference on Learning Representations, Apr. 26, 2020, 27 Pages.
Xiao, et al., "Fashion-MNIST: a Novel Image Dataset for Benchmarking Machine Learning Algorithms", In Repository of arXiv:1708.07747, Aug. 25, 2017, 06 Pages.
Zhang, et al., "mixup: Beyond empirical risk minimization", In International Conference on Learning Representations, Apr. 30, 2018, 13 Pages.
Alvarez-Melis, et al., "Dataset Dynamics via Gradient Flows in Probability Space", In Repository of arXiv:2010.12760v2, Jun. 16, 2021, 19 Pages.
"International Search Report and Written Opinion Issued in PCT Application No. PCT/US21/039731", dated Dec. 1, 2021, 15 Pages.
Xu, et al., "Wasserstein Distance Based Domain Adaptation for Object Detection", In Repository of arXiv:1909.08675v1, Sep. 18, 2019, 11 Pages.
Zhang, et al., "A Deep Transfer Model With Wasserstein Distance Guided Multi-Adversarial Networks for Bearing Fault Diagnosis Under Different Working Conditions", In Journal of IEEE Access, vol. 7, May 14, 2019, pp. 65303-65318.
Agueh, et al., "Barycenters in the wasserstein space", In the SIAM Journal on Mathematical Analysis, vol. 43, Issue 2, Dec. 10, 2010, 27 Pages.
Alvarez-Melis, et al., "Optimal Transport Dataset Distance (OTDD)", Retrieved from: https://github.com/microsoft/otdd, Feb. 17, 2022, 5 Pages.
Ambrosio, et al., "Gradient flows: in metric spaces and in the space of probability measures", Published in the Springer Science & Business Media, 2005, 2005, 342 Pages.
Asadulaev, et al., "Neural Optimal Transport with General Cost Functionals", In Repository of arXiv:2205.15403v1, May 30, 2022, 18 Pages.
Bowles, et al., "GAN Augmentation: Augmenting Training Data using Generative Adversarial Networks", In Repository of arXiv:1810.10863v1, Oct. 25, 2018, 12 Pages.
Brenier, Yann, "Polar factorization and monotone rearrangement of vector-valued functions", In Journal of Communications on pure and applied mathematics, vol. 44, Issue 4, Jun. 1991, pp. 375-417.
Brown, et al., "Language Models are Few-Shot Learners", In Proceedings of the Thirty-fourth Conference on Neural Information Processing Systems, Dec. 6, 2020, 25 Pages.
Bunne, et al., "Proximal Optimal Transport Modeling of Population Dynamics", In Proceedings of the 25th International Conference on Artificial Intelligence and Statistics, vol. 151, Mar. 28, 2022, 18 Pages.
Bunne, et al., "Supervised Training of Conditional Monge Maps", In Repository of arXiv:2206.14262v1, Jun. 28, 2022, 23 Pages.
Caron, et al., "QP Solvers for Python", Retrieved from: https://github.com/stephane-caron/qpsolvers, Aug. 19, 2022, 6 Pages.
Chuang, et al., "Fair Mixup: Fairness via Interpolation", In Proceedings of the International Conference on Learning Representations, May 4, 2021, 15 Pages.
Cohen, et al., "EMNIST: Extending MNIST to handwritten letters", In Proceedings of the International Joint Conference on Neural Networks, May 14, 2017, pp. 2921-2926.
Craig, Katy, "The Exponential Formula for the Wasserstein Metric", In Journal of ESAIM: Control, Optimisation and Calculus of Variations, vol. 22, Issue 1, Jan. 15, 2016, pp. 169-187.
Deserno, et al., "U-Net: Semantic segmentation with PyTorch", Retrieved from: https://github.com/milesial/Pytorch-UNet, Oct. 24, 2022, 7 Pages.
Dvurechensky, et al., "Computational Optimal Transport: Complexity by Accelerated Gradient Descent is Better than by Sinkhorn's Algorithm", In Proceedings of the 35th International Conference on Machine Learning, vol. 80, Jul. 10, 2018, 10 Pages.
Fadel, et al., "pytorch_ema", Retrieved from: https://github.com/fadel/pytorch_ema, Nov. 18, 2021, 4 Pages.
Fan, et al., "Generating Synthetic Datasets by Interpolating along Generalized Geodesics", In Proceedings of NeurIPS 2022 Workshop on Synthetic Data for Empowering ML Research, Dec. 2, 2022, 14 Pages.
Fan, et al., "Scalable Computation of Monge Maps with General Costs", In the Repository of arXiv:2106.03812v1, Jun. 7, 2021, 17 Pages.
Fan, et al., "Scalable Computations of Wasserstein Barycenter via Input Convex Neural Networks", In the Repository of arXiv:2007.04462v1, Jul. 8, 2020, 16 Pages.
Fan, et al., "Variational Wasserstein gradient flow", In Proceedings of the 39th International Conference on Machine Learning, vol. 162, Jul. 17, 2022, 31 Pages.
Gao, et al., "An Information-Geometric Distance on the Space of Tasks", In Proceedings of the 38th International Conference on Machine Learning, vol. 139, Jul. 18, 2021, 11 Pages.
Gazdieva, et al., "Unpaired Image Super-Resolution with Optimal Transport Maps", In Repository of arXiv:2202.01116v1, Feb. 2, 2022, 13 Pages.
Jain, et al., "A Data-Based Perspective on Transfer Learning", In Repository of arXiv:2207.05739v1, Jul. 12, 2022, 31 Pages.
Jordon, et al., "PATE-GAN: Generating Synthetic Data with Differential Privacy Guarantees", In Proceedings of the International Conference on Learning Representations, May 6, 2019, 21 Pages.
Kabir, et al., "SpinalNet: Deep Neural Network With Gradual Input", In Journal of IEEE Transactions on Artificial Intelligence, Jun. 21, 2022, 13 Pages.
Kirkpatrick, et al., "Overcoming catastrophic forgetting in neural networks", In Proceedings of the National Academy of Sciences, vol. 114, Issue 13, Mar. 28, 2017, pp. 3521-3526.
Korotin, et al., "Continuous Wasserstein-2 Barycenter Estimation without Minimax Optimization", In Repository of arXiv:2102.01752v1, Feb. 2, 2021, 19 Pages.
Korotin, et al., "Neural Optimal Transport", In the Repository of arXiv:2201.12220v1, Jan. 28, 2022, 22 Pages.
Korotin, et al., "Wasserstein Iterative Networks for Barycenter Estimation", In Repository of arXiv:2201.12245v1, Jan. 28, 2022, 21 Pages.
Liu, et al., "Wasserstein GAN Wth Quadratic Transport Cost", In Proceedings of the IEEE/CVF international conference on computer vision, Oct. 27, 2019, pp. 4832-4841.
Liu, Huidong, "WGAN-QC", Retrieved from: https://github.com/harryliew/WGAN-QC, Nov. 25, 2019, 3 Pages.
Makkuva, et al., "Optimal transport mapping via input convex neural networks", In Proceedings of the 37th International Conference on Machine Learning, vol. 119, Jul. 13, 2020, 10 Pages.
McCann, Robertj., "A Convexity Principle for Interacting Gases", In Journal of Advances in Mathematics, vol. 128, Issue 1, Jun. 1, 1997, pp. 153-179.
McCann, Robertj., "Existence and uniqueness of monotone measure-preserving maps", In the Duke Mathematical Journal, vol. 80, Issue 2, Nov. 1995, pp. 309-323.
McCloskey, et al., "Catastrophic Interference in Connectionist Networks: The Sequential Learning Problem", In Journal of Psychology of Learning and Motivation, vol. 24, 1989, pp. 109-165.
Mokrov, et al., "Large-Scale Wasserstein Gradient Flows", In Proceedings of the Thirty-Fifth Conference on Neural Information Processing Systems, Dec. 7, 2021, 14 Pages.
Perrot, et al., "Mapping Estimation for Discrete Optimal Transport", In Proceedings of the 30th Conference on Neural Information Processing Systems, Dec. 5, 2016, 9 Pages.
Pooladian, et al., "Entropic estimation of optimal transport maps", In Repository of arXiv:2109.12004v1, Sep. 24, 2021, 30 Pages.

(56) References Cited

OTHER PUBLICATIONS

Ronneberger, et al., "U-Net: Convolutional Networks for Biomedical Image Segmentation", In Proceedings of the 18th International Conference on Medical Image Computing and Computer-Assisted Intervention, Part III, Oct. 5, 2015, pp. 234-241.

Rout, et al., "Generative Modeling with Optimal Transport Maps", In Proceedings of the Tenth International Conference on Learning Representations, Apr. 25, 2022, 22 Pages.

Sandfort, et al., "Data augmentation using generative adversarial networks (CycleGAN) to improve generalizability in CT segmentation tasks", In Journal of Scientific Reports, Nov. 15, 2019, 9 Pages.

Srivastava, et al., "Scalable Bayes via Barycenter in Wasserstein Space", In Journal of Machine Learning Research, vol. 19, Issue 1, Jan. 1, 2018, 35 Pages.

Zhang, et al., "How Does Mixup Help With Robustness and Generalization?", In Proceedings of the International Conference on Learning Representations, May 4, 2021, 24 Pages.

Sinkhorn, Richard, "Diagonal Equivalence to Matrices with Prescribed Row and Column Sums", In Proceedings of the American Mathematical Society, vol. 45, Issue 2, Aug. 1974, pp. 195-198.

\* cited by examiner

GRADIENT FLOWS IN DATASET SPACE

RELATED APPLICATION

This application claims the benefit of priority to U.S. Provisional Patent application 63/083,009 filed on Sep. 24, 2020 and titled "Gradient Flows in Dataset Space", and to U.S. Provisional Patent application 63/091,837 filed on Oct. 14, 2020 and titled "Gradient Flows in Dataset Space", the contents of which are incorporated herein by reference in its entirety.

BACKGROUND

A current practice in machine learning (ML) is model-centric. The current practice casts problems as adjustments over model parameters, all the while assuming the data is either fixed, or subject to extrinsic and inevitable change. This practice fails to capture important existing aspects of ML, such as the data manipulation (e.g., augmentation) that goes into usual ML design, training, and operation. Further, this practice is ill-suited to formalize novel data-centric problems, such as model-agnostic transfer learning or dataset synthesis.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Embodiments can perform operations for machine learning (ML) in a manner that is different from a traditional ML paradigm. Embodiments can flow a first dataset towards a second dataset based on a specified objective. Instead of modifying model parameters to satisfy the objective, embodiments can allow a dataset to be modified ("flowed") to satisfy the objective.

A method, system, computer-readable medium, a device, or the like can be configured to implement one or more embodiments. A method for ML that flows a dataset towards a target dataset can include receiving a request to operate on a first dataset including first feature, label pairs. The method can include, identifying a second dataset from multiple datasets, the second dataset including second feature, label pairs. The method can include determining a distance between the first feature, label and the second feature, label pairs. The method can include flowing the first dataset using a dataset objective that operates based on the determined distance to generate an optimized dataset.

The method can further include, wherein each label is represented by a probability distribution of features mapped to the label in the distance determination. The method can further include operating a first ML model trained on the second dataset with the altered first dataset as input to provide a result. The method can further include training a second ML model using the altered first dataset and at least a portion of the second dataset. The method can further include providing the altered first dataset.

The method can further include keeping the first ML model static during training. The method can further include, wherein determining the distance includes determining a differentiable distance. The method can further include, wherein the distance includes an optimal transport distance (OTD). The method can further include, wherein determining the OTD includes determining a distance between respective labels of the first and second datasets based on features of datapoints of the first and second datasets associated with the respective labels. The method can further include, wherein flowing the first dataset includes determining gradients of the dataset objective with respect to the first dataset and flowing the first dataset further includes updating the first dataset using the determined gradient. The method can further include, wherein the dataset objective includes at least one of minimizing internal energy, minimizing potential energy, minimizing distance, or minimizing interaction energy.

The method can further include, wherein the dataset objective includes minimizing distance between feature, label pairs. The method can further include, wherein updating the first dataset using the determined gradient includes using a feature-driven update, joint-driven fixed-label update, or a joint-driven variable-label update. The method can further include, wherein the first dataset and the second dataset include image datasets or the first dataset and the second dataset include natural language processing (NLP) datasets.

DETAILED DESCRIPTION

Figure 1:
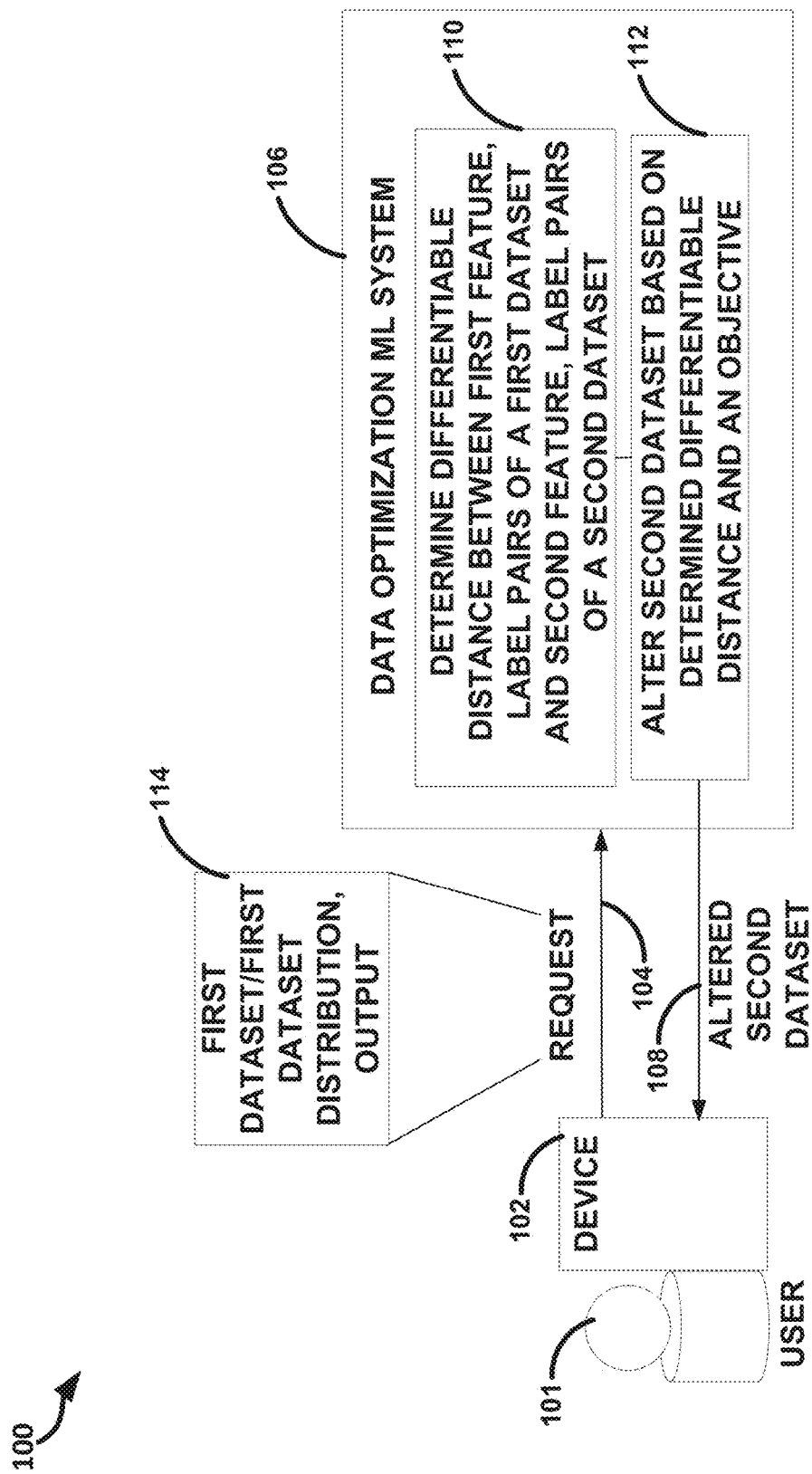
FIG. 1 illustrates, by way of example, a logical block diagram of an embodiment of a system for dataset optimization.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

In a traditional ML process, the learning task is focused on inference, regularization, and data preprocessing approached from a model-centric viewpoint. In the traditional ML paradigm, an optimization problem is cast as finding the parameters of the model that minimize some dataset objective (e.g., empirical risk) on a given dataset. Throughout this process, the data distribution is typically assumed to be fixed and immutable. When it is not, such as in the transfer learning and domain adaptation paradigms, the source of change is assumed to be extrinsic and beyond control. As such, these paradigms too are cast as learning optimal model parameters, with the added constraint that these should account for the changes in data distributions. Thus, most of ML can be understood, from the optimization perspective, as model parameter optimization.

In contrast to normal ML practice, embodiments view a dataset as variable and optimize the dataset. This view casts the ML tasks as an optimization over data-generating distributions. Embodiments approach this class of problems through a gradient flow in a dataset probability space. Embodiments provide practical and efficient particle-based methods that are flexible and well-behaved for a variety of dataset objectives. Embodiments provide a framework that is effective for dataset interpolation, synthesis, aggregation, data privacy in ML, among other applications.

Embodiments provide devices, systems, and methods generated using a fundamentally different class of optimization problems. The optimization problems are focused on a dynamic dataset rather than a dynamic model. Broadly, the optimization problems involve finding or modifying a dataset to optimize some dataset objective function of interest. The dataset objective can pertain to a specific model (e.g., what is the dataset on which this model performs best?) or can be model-agnostic (e.g., what is the most similar linearly separable dataset?). This dataset optimization paradigm is a very different approach to ML than model parameter optimization. Embodiments provide solutions to common ML problems, such as dataset generation, that are not solved using the traditional ML paradigm. Retaining enough data to train an ML model that is sufficiently accurate across a domain of interest can be very challenging. This is, at least in part, because training an ML model to sufficient accuracy can require thousand, tens of thousands, hundreds of thousands, or even millions of data samples (features, label) pairs. Annotating (determining or verifying a label for a particle set of features) can be very time consuming and prohibitively expensive. Further, an ML model that has been trained on a dataset that includes features with a first distribution may not be sufficiently accurate when operating on data with a second, different distribution (even if the distributions are similar). Thus, generating a dataset is a technical problem. Embodiments provide a technical solution to such a problem, among other problems.

Embodiments provide tools to formalize various well-known data processing heuristics that form part of most state-of-the-art ML pipelines, such as data augmentation, dataset pooling or instance mixing. Embodiments also allow for posing new problems or casting existing problems under a new light, such as dataset synthesis with certain (e. g., size or privacy) constraints, missing data imputation, or data compression. Meta-learning is another problem where a dataset-centric approach is relevant. Meta-learning can 'retro-fit' new tasks to the domain of expertise of the trained model, instead of the usual scheme that adapts the model parameters to the tasks by optimizing the dataset based on the dataset objective.

At least two characteristics set the model parameter optimization and dataset optimization paradigms apart. First, the dataset optimization paradigm is inherently model-independent. This allows for dataset manipulation that is not tailored to a specific model. The generated dataset can provide benefits to all models trained or operating on the generated dataset. Second, while model parameter optimization is usually cast as a finite-dimensional problem (e.g., over $R^k$ for a model with k parameters), dataset optimization is most naturally formulated as one over infinite-dimensional space. While a dataset might consist of finitely many samples, the precise number is seldom relevant and often unspecified (e.g., in streaming settings). Instead, the true object of interest is the generative process that gives rise to the dataset. For example, in the context of supervised learning, a dataset might be characterized through a joint distribution $p(X, Y)$, where X and Y are features and labels, respectively, and can be represented by distributions of pairs of features and labels. In this case, the optimization problem would be defined over the space of joint distributions $P(X \times Y)$, (e.g., finding $p^* \in P(X \times Y)$ that minimizes a given dataset objective $F(p)$). There are various ways to approach and formalize such a problem. Embodiments can use gradient flows, a linchpin of applied mathematics for modeling dynamics in very general infinite dimensional spaces. A gradient flow using a gradient descent, is a first-order derivative, iterative technique for finding a local minimum of a differentiable function. To find a local minimum of a function using gradient descent, steps proportional to a negative of a gradient (or approximate gradient) of the function at the current point are taken. Gradient flows come with various appealing properties: they are inherently flexible both in terms of the underlying space and types of dynamics they can model, they admit rigorous convergence analysis, and they produce, in addition to a final minimizing solution, a full trajectory of iterates, which are often useful.

But harnessing gradient flows for labeled dataset optimization poses various challenges. A suitable representation of feature-label pairs and a meaningful metric between datasets is difficult to define. Then, one must find a class of flows that are expressive enough to model interesting dataset objective functions on datasets, yet sufficiently well-behaved to allow for tractable optimization. In response to the first of these challenges, embodiments leverage a recently proposed notion of distance between datasets based on optimal transport (OT), called the optimal transport distance (OTD) or optimal transport dataset distance (OTDD), which provides the space of joint distributions with a meaningful metric. By making this metric differentiable, it can be optimized. Embodiments can use dataset objectives that can be re-purposed to encode various dataset-related dataset objectives. As a result, embodiments provide a framework for dataset optimization that is flexible and efficient.

In general, embodiments can use a differential distance metric and gradient flows based on a determined distance to optimize a dataset for a dataset objective. The details of an example differentiable distance metric (OTDD) and gradient flows are discussed further below. Reference will now be made to the FIGS. to provide further details and applications of embodiments.

FIG. 1 illustrates, by way of example, a diagram of an embodiment of a system 100 for dataset optimization. The system 100 as illustrated includes a user 101 with a device 102. The device 102 can issue a request 104 to a data optimization ML system 106. The request 104 can indicate a location of a first dataset, include the first dataset, or the like. The request 104 can indicate a result desired, such as an ML model, data that meets certain criteria, or the like.

The device 102 is a compute device, such as a computer (e.g., laptop, desktop, handheld, smartphone, tablet, phablet, or the like). The device 102 can access a data optimization ML system 106. The data optimization ML system 106 can operate on the first dataset to satisfy a dataset objective. In the example of FIG. 1 the user 101 has requested more data, such as for training or classification (e.g., using a traditional ML paradigm). The data optimization ML system 106 can include processing circuitry configured to implement operations 110, 112.

The processing circuitry can include electric or electronic components, software or firmware executing on the electronic or electronic components, or a combination thereof. The electric or electronic components can include one or more resistors, transistors, capacitors, diodes, inductors, logic gates (e.g., AND, OR, XOR, negate, buffer, or the like), switches, power supplies, oscillators, analog to digital converters, digital to analog converters, amplifiers, memory devices, processing devices (e.g., a central processing unit (CPU), field programmable gate array (FPGA), graphics processing unit (GPU), application specific integrated circuit (ASIC), or the like), a combination thereof, or the like).

The request 104 as illustrated includes a first dataset or a distribution of a first dataset and a desired output (classification, dataset, ML model, or the like). The distribution of the first dataset can include a mean, covariance, shape (e.g., mixture of Gaussian, or the like).

The operation 110 includes determining a differentiable distance between feature, label pairs of the first dataset provided by the user 101 and one or more second datasets. The differentiable distance can include OTDD. The operation 110 can include identifying one or more of the second datasets that are closest to the first dataset. A closer dataset can require less processing (fewer number of iterations) to achieve a dataset objective than a dataset that is further away. The identified second dataset can be altered, at operation 112, to maximize an objection. The operation 112 can include using a gradient flow and the determined differentiable distance to minimize a dataset objective. The dataset objective can include potential energy, Wasserstein distance, internal energy, interaction energy, or a combination thereof. The dataset objective can enforce a constraint on the data alteration, such as separability between labels (e.g., by potential or interaction energy), constraints on a feature norm, dataset similarity (e.g., via a distance dataset objective), an entropy consideration (e.g., using internal energy) another constraint, or a combination thereof.

Table 1 shows the differentiable distance between various datasets:

TABLE 1

OTDD between some National Institute of Standards and Technology (NIST) datasets as well as the United States Postal Service dataset.

|  | MNIST | EMNIST | FashionMNIST | KMNIST | USPS |
|---|---|---|---|---|---|
| MNIST |  | 1.04 | 1.74 | 1.41 | 1.26 |
| EMNIST | 1.04 |  | 1.57 | 1.28 | 1.32 |
| FashionMNIST | 1.74 | 1.57 |  | 1.67 | 1.10 |
| KMNIST | 1.41 | 1.28 | 1.67 |  | 1.30 |
| USPS | 1.26 | 1.32 | 1.10 | 1.30 |  |

Table 1 results suggest that MNIST and EMNIST are the closest (most similar) among the datasets of Table 1, while fashionMNIST and MNIST are the furthest (least similar) among the datasets of Table 1. If the first dataset were USPS, fashionMNIST could be the second dataset 108, since it is closest to USPS among the available datasets.

The altered second dataset 108 can then be provided to the user 101, via the device 102, for example. The altered second dataset 108 can then be used as additional data of the first dataset, especially if distance was the dataset objective at operation 112. The user 101 can then have more data to train and/or test an ML model using the traditional ML paradigm.

Additionally, or alternatively, the privacy of persons associated with the data in the first or second datasets can be preserved by altering the dataset towards the other dataset, and then operating on the altered dataset. The altered second dataset 108 can be considered samples from a distribution representing the first dataset. The additional data provided by the altered second dataset 108 can help improve the accuracy, reduce bias, or the like of the ML model of concern to the user 101.

Figure 2:
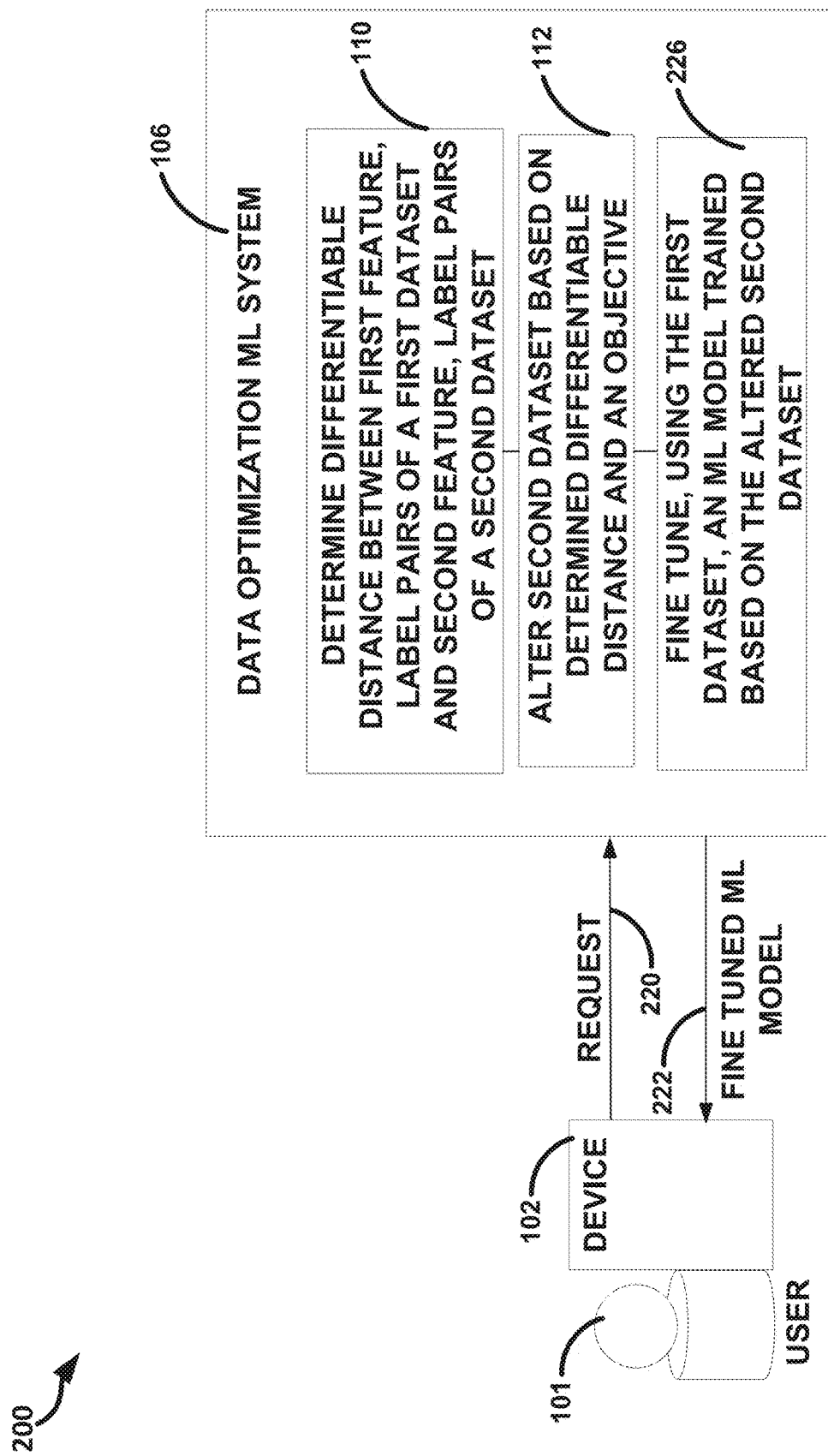
FIG. 2 illustrates, by way of example, a logical block diagram of another embodiment of a system for dataset optimization.

FIG. 2 illustrates, by way of example, a diagram of an embodiment of another system 200 for dataset optimization. The system 200 is similar to the system 100, with the request 220 of the system 200 being different than the request 104 of the system 100 causing the data optimization ML system 106 to provide a different output (a fine tuned model 222 in the example of FIG. 2). The data optimization ML system 106 of the system 200 receives the request 220 communicated by the device 102. The request 220, in the example of FIG. 2, is for an ML model 222. The data optimization ML system 106 can perform the operation 110 as it does in the system 100.

The data optimization ML system 106 can alter the second dataset based on the determined differentiable distance and a dataset objective, at operation 112. The first dataset can then be used to fine tune an ML model that was trained based on the altered second dataset, at operation 226. The fine-tuned ML model 222 can be provided to the device 102.

Figure 3:
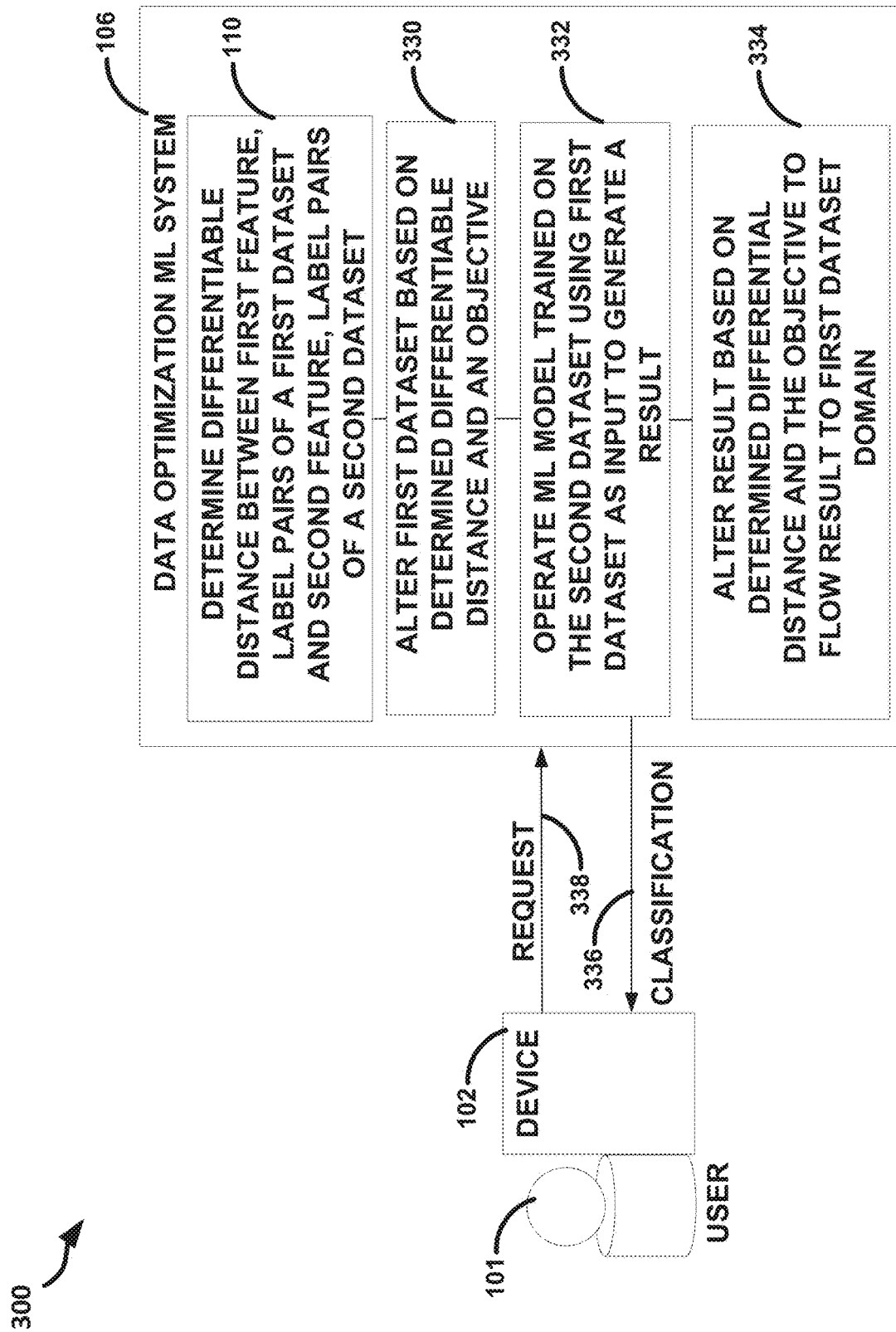
FIG. 3 illustrates, by way of example, a logical block diagram of yet another embodiment of a system for dataset optimization.

FIG. 3 illustrates, by way of example, a diagram of another embodiment of a system 300 for dataset optimization. The system 300 is similar to the systems 100 and 200 with the data optimization ML system 106 of FIG. 3 performing some different operations than the systems 100, 200. In the system 300, the user 101 issues a request 338 for a classification 336. The user 101, in any of the systems 100, 200, 300, can provide (i) a distribution (e.g., mean and covariance) for features mapped to labels of a first dataset of which the data to be classified is a member, (ii) features associated with the labels, (iii) the first dataset, or a combination thereof.

The data optimization ML system 106 can determine a differentiable distance, at operation 110, based on the data provided by the user 101. The data optimization ML system 106 can alter the first dataset or the other data provided by the user 101 based on the determined differentiable distance and a dataset objective, at operation 330. The operation 330, if the dataset objective is to minimize the OTDD or other distance between the first dataset and the second dataset can move the distribution of the first dataset towards the distribution of the second dataset. This is beneficial because the second dataset could have been used to train a ML model. If the first dataset or other data provided by the user 101 to be classified is within the distribution of the second dataset, the ML model can operate to determine a classification for the data, but in the domain of the second dataset, which may not have overlapping labels with the first dataset. Since the gradient flow and the distance determination are differentiable, the process is reversible. This means that the classification in the domain of the second dataset can be flowed back to the domain of the first dataset, keeping the label variable, to determine the appropriate label in the first dataset domain based on the classification in the second dataset domain.

To perform the data flow, the ML model trained in the second dataset domain is used to operate on the altered first dataset or altered other data provided by the user 101, at operation 332. Then, at operation 334, the reverse of operation 330 is performed on the features and label generated at operation 332. The operation 334 includes altering the result based on determined differentiable distances between the result and the first dataset to flow the result to the domain of the first dataset.

The operations of FIG. 3 can be used, for example, in natural language processing (NLP). In NLP, storing a Bidirectional Encoder Representation from Transformers (BERT) is prohibitive because a BERT is prohibitively large. In an email model of a user, normally the model (BERT) is pretrained based on user-specific data. Using the operations of FIG. 3, a BERT can be learned on a standard corpus (ENRON emails for example), and instead of altering the BERT to the user domain, the user domain data can be moved to the BERT domain. Then, the BERT can be used to operate on the altered user domain data. Then the result from operating the BERT can be moved towards the user domain to generate user-specific NLP data.

The operations that regard altering the dataset and determining a differentiable distance can include backpropagation on the dataset using gradient flows and OTDD (or other differentiable distance metric), respectively. These operations are discussed in more detail, including a mathematical description, below.

A problem with determining distances between feature, label pairs is that features are continuous (vectors) and labels are discrete. Determining a distance between features can be performed many ways. However, the discrete nature of labels makes it more difficult to determine distances between feature, label pairs. A solution provided by embodiments is to represent the label as a distribution of features mapped to the label. Then, a differentiable distance metric can be used to determine a distance between distributions (labels).

Figure 4:
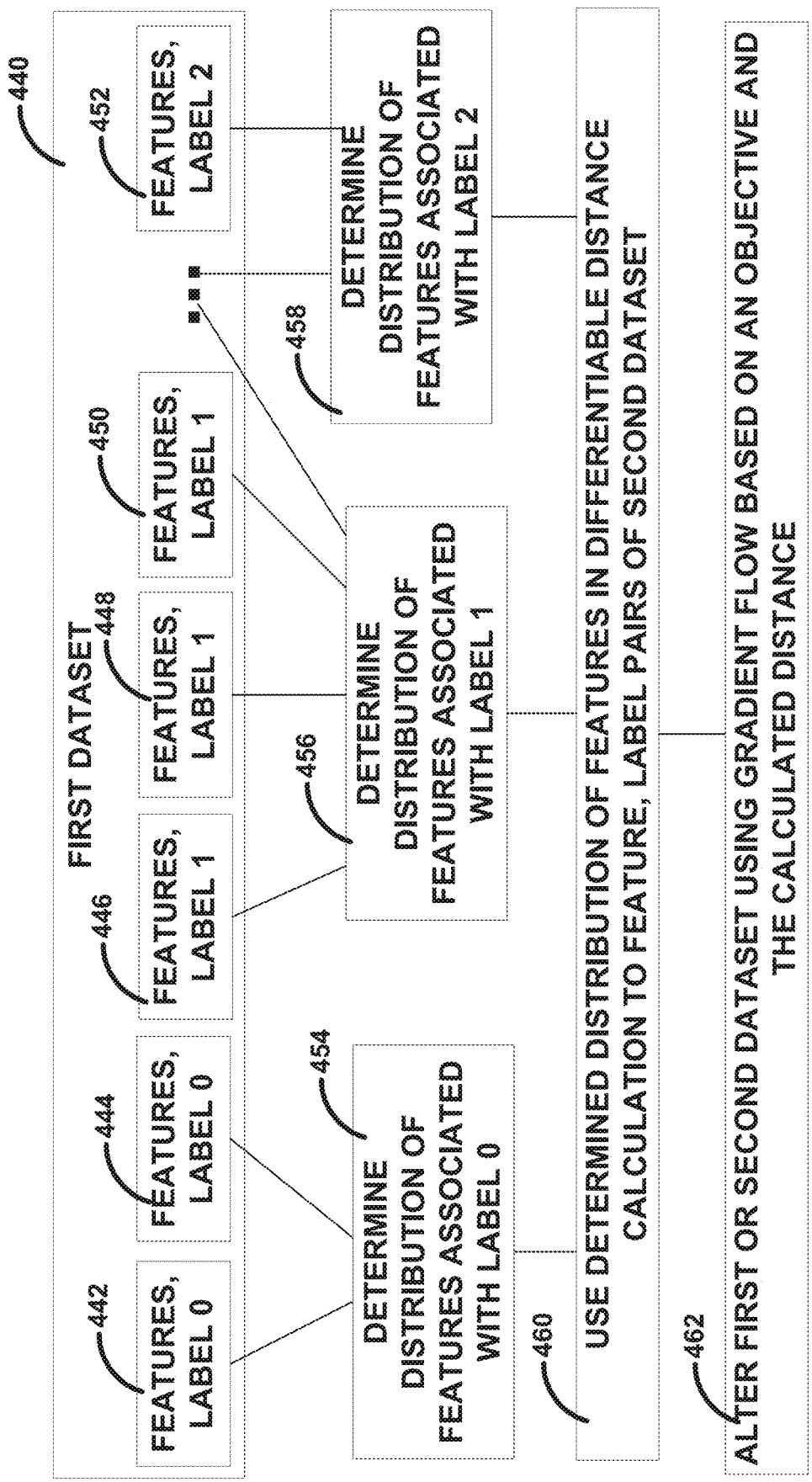
FIG. 4 illustrates, by way of example, a flow diagram of an embodiment of a technique for dataset optimization.

FIG. 4 illustrates, by way of example, a logical diagram of grouping feature, label pairs by label and determining a distribution (mean and covariance) of features per label. In FIG. 4, a first dataset 440 includes samples comprising features, label pairs 442, 444, 446, 448, 450, 452. Each of the features are mapped to associated labels, such as by an ML technique, human analyst, or the like. The features mapped to a label are associated and form the features, label pairs 442, 444, 446, 448, 450, 452.

The feature, label pairs 442, 444, 446, 448, 450, 452 are grouped, sorted, or the like, by label. The features mapped to label 0 are used to determine a distribution (mean and variation (e.g., standard deviation, covariance, variance, or the like), and shape) of features associated with label 0 at operation 454. The features mapped to label 1 are used to determine a distribution of features associated with label 1 at operation 456. The features mapped to label 2 are used to determine a distribution of features associated with label 2 at operation 456. Note that more or fewer labels are possible.

At operation 460, the distribution of the features determined at operations 454, 456, and 458 are then used, along with the features, to determine a differentiable distance between features, label pairs (with the label of the pairs being represented by the determined distributions). At operation 462, the first or second dataset is then altered based on the distance and a dataset objective (which can be minimizing the distance, such as with or without constraints or another dataset objective). The altered first or second dataset can then be used for an application in a traditional ML paradigm, such as transfer learning, classification, feature, label pair generation, dataset interpolation, or the like.

A mathematical description and discussion of OTD, OTDD, gradient flows, and their interoperability is provided. Let $\chi$ be a Polish space with metric d, and $P(\chi)$ be a set of non-negative Borel measures with finite second-order moment on the Polish space. Consider both continuous and discrete measures, the latter represented as an empirical distribution: $\Sigma_{i=1}^{N} p_i \delta_{x_i}$, where $\delta_x$ is a Dirac at position x$\times\chi$. For a measure, $\rho$, and measurable map T: $\chi \rightarrow \chi$, $T_{\#}\rho$ denotes a push-forward measure. Embodiments operate in a supervised ML setting; thus, a dataset is defined as a set of feature, label pairs $\{(x_i, y_i)\}$. The dataset can be assumed to be sampled from some distribution such that $\alpha \in P(\chi \times \mathcal{Y})$. A dataset is denoted as $D_\alpha$ to make the sampling explicit. Shorthand notations $\triangleq$ (x,y) and $Z \triangleq \chi \times \mathcal{Y}$ are used. $\Delta$·denotes a convergence operator.

In general, OTD is a differentiable distance measure. OTD is model agnostic and does not involve training. OTD relies on optimal transport. OTD uses a hybrid Euclidean-Wasserstein between feature-label pairs across domains (different datasets). Each label is modeled as a distribution of feature vectors associated with the label. Modeling the feature vectors in this way allows for comparison of datasets, even if the label sets are completely disjoint (non-overlapping).

In mathematical terms, optimal transport can be described for measures $\beta, \beta \in P(\chi)$ and cost function $c: \chi \times \chi \rightarrow \mathbb{R}_+$, as:

$$OT_c(\alpha, \beta) \triangleq \min_{\pi \in \Pi(\alpha, \beta)} \int c(x_1, x_2) d\pi(x_1, x_2) \qquad \text{Equation 1}$$

Where $\Pi(\alpha,\beta)$ is the set of couplings (transportation plans) between $\alpha$ and $\beta$ such that:

$$\Pi(\alpha,\beta) \triangleq \{\pi \in P(\chi \times \chi) | P_{1\#}\pi = \alpha, P_{2\#}\pi = \beta\} \quad \text{Equation 2}$$

Where $c(x,y) = d(x,y)^p$ for $p \geq 1$, $W_p \triangleq OT_c(\alpha,\beta)^{1/p}$ is called the p-Wasserstein distance. $W_p$ defines a distance on $P(\chi)$. $\mathbb{W}_p(\chi) = (P(\chi), W_p)$ is a metric space called the (p-)Wasserstein space.

$$OT_c(\alpha,\beta) = \sup_{\varphi \in C(\chi)} \int \varphi \, d\alpha + \int \varphi^c \, d\beta \quad \text{Equation 3}$$

Where $\varphi: \chi \to \mathbb{R}$ is known as the Kantorovich potential and $\varphi^c$ is its c-conjugate: $\varphi^c(x) = \inf_{x' \in \chi} c(x,x') - \varphi(x)$. For $c(x,x') = \|x-x'\|^2$, $\phi^c$ is the Fenchel conjugate.

A dynamic formulation for optimal transport (OT) is:

$$W_p^p(\alpha,\beta) = \min_{\mu_t, V_t} \int_0^1 \int \|V_t(x)\|^p d\mu_t(x) dt \quad \text{Equation 4}$$

Where the minimum is taken over pairs satisfying $\mu_0 = \alpha$, $\mu_1 = \beta$ and a continuity equation:

$$\partial_t \mu_t = -\nabla \cdot (\mu_t V_t) \quad \text{Equation 5}$$

In this formulation, a shortest path among paths for a measure $\mu_t$ advecting from $\alpha$ to $\beta$. Formally, this is the minimum of the metric derivative. The dynamic formulation focuses on local transfer (via $\mu_t$), compared to a global correspondence (via $\pi$) in the static formulation presented in Equation 1.

OT can be used to define a distance (OTD) between datasets. But for labeled datasets, this is non-trivial. An issue is that a solution to the problem of the distance includes an element-wise metric d, which for labeled datasets includes defining a distance between feature label pairs of different datasets. For the general classification case, where $\mathcal{Y}$ is a discrete set, this is difficult. To overcome this issue, the labels, y, can be represented as distributions over features mapped to the respective labels. For a simple digit classification problem, $\alpha_1$ is a distribution over images with a specific label, such as y=1 (digit=1).

Using a metric on $\mathcal{Z}$ as $d_z(z,z')^p \triangleq d_\chi(x,x')^p + W_p^p(\alpha_y, \alpha_{y'})$. Using $d_Z$ as a ground cost in Equation 1 yields a distance between measures on datasets. This is called OT dataset distance (OTDD) and defined formally in Equation 6:

$$OTDD(D_\alpha, D_\beta) \triangleq \left(\min_{\pi \in \Pi(\alpha,\beta)} \int d_z(z,z') \pi(z,z')\right)^{1/2} \quad \text{Equation 6}$$

An advantage of the OTDD is that it is valid even if the label sets of the two datasets are non-overlapping, or if there is no explicit known correspondence between them (e.g., digits to letters, cats to clothes, or the like). The distance' independence on label overlap is from a geometric treatment of features and labels.

A gradient flow is defined on a function F: $\chi \to \mathbb{R}$ and a point $x_0 \in \chi$. A gradient flow is a continuous curve x(t) that evolves from $x_0$ in the direction of steepest descent of F. When $\chi$ is Hilbertian (complete so that calculus can be used and possesses the structure of an inner product that allows length and angle to be measured) and F is sufficiently smooth, the gradient flow can be expressed as a solution to a differential equation $x'(t) = -\nabla F(x(t))$ with initial condition $x(0) = x_0$. Some discretized gradient descent techniques include momentum and acceleration.

The formulation of OTDD and gradient descent is now used to explain dataset optimization using the same. Given a dataset objective on a dataset expressed as a functional F: $P(Z) \to \mathbb{R}$ determine a joint measure $\rho \in P(Z)$ that realizes Equation 7:

$$\min_{\rho \in P(Z)} F(\rho) \quad \text{Equation 7}$$

A gradient flow approach (moving along a curve of steepest descent starting at $\rho_0$ until reaching a solution $\rho^*$. Unfortunately, $\mathbb{W}_p(Z)$ is infinite-dimensional and non-Hilbertian. To overcome this a notion of a derivative (variation) is provided:

Given a functional $F: P(\Omega) \to \mathbb{R}$, consider a perturbation $\chi$ such that at least for every $\varepsilon \in [0, \varepsilon_0]$, $\rho + \varepsilon \chi \in P(\Omega)$. If there exists a function G such that $$\frac{d}{d\varepsilon} F(\rho + \varepsilon \chi)|_{\varepsilon=0} = \int G(\rho) d\chi$$

for every such perturbation $\chi$, G is called the first variation of F at $\rho$, and denote it by $$\frac{\delta F}{\delta \rho}.$$

The gradient flow $(\rho_t)_{t \geq 0}$ of F is then characterized as a solution of Equation 8:

$$\partial_t \rho_t = \nabla \cdot \left(\rho_t \nabla \frac{\delta F}{\delta \rho}(\rho_t)\right) \quad \text{Equation 8}$$

Equation 8 includes a term resembling a gradient in a Wasserstein metric, which is $\nabla_W F(\rho)$. Equation 8 is a continuity equation for $\rho_t$ and a velocity field $$-\nabla \frac{\delta F}{\delta \rho}(\rho_t).$$

One dataset objective is the Wasserstein distance to a target distribution:

$T_\beta(\rho) \triangleq W_2(\rho,\beta)$, which can be determined using OTDD as discussed previously. Other dataset objectives are possible, such as the dataset objectives defined in Equations 9, 10, and 11.

$$\mathcal{F}_{(\varphi = \int f(\rho(z))dz} \quad \text{Equation 9}$$

$$\mathcal{V}_{(\rho) = \int V(z)d\rho} \quad \text{Equation 10}$$

$$\mathcal{W}_{(\rho) = \frac{1}{2}\iint W(z-z')d\rho(z)d\rho(z')} \quad \text{Equation 11}$$

Where f: $\mathbb{R} \to \mathbb{R}$ is convex and superlinear and V, W:$\chi \to \mathbb{R}$ are convex and sufficiently smooth. These terms have a physical interpretation as internal, potential, and interaction energies, respectively. These dataset objectives can be used with backpropagation through automatic differentiation. A combination of one or more of these dataset objectives can be used as the dataset objective. The dataset objective of interest can thus be expressed as in Equation 12:

$$F(\rho)=T_\beta(\rho)+\mathcal{F}(\rho)+\mathcal{V}(\rho)+\mathcal{W}(\rho) \quad \text{Equation 12}$$

A first variation of each dataset objective is provided in Equation 13:

$$\frac{\delta F}{\delta \rho}=f'(\rho),\ \frac{\delta V}{\delta \rho}=V,\ \frac{\delta W}{\delta \rho}=W*\rho,\ \frac{\delta T_\beta}{\delta \rho}=\varphi_\rho \quad \text{Equation 13}$$

Where * denotes a convolution operator between a measurable function and a measure, and $\varphi_\rho$ is the Kantorovich potential in the dual OT formulation (Equation 3). The gradient flow for dataset objectives in the form of Equation 12 is a solution of Equation 14:

$$\partial_t \rho = \nabla \cdot (\rho \nabla (f'(\rho)+V+W*\rho+\varphi_\rho) \quad \text{Equation 14}$$

In the context of probability densities and datasets, a probability density equation (PDE) can be understood as a conservation-of-mass principle: no probability mass is created or destroyed in the sequence of densities on $\chi \times \mathcal{Y}$ that solve this system. For a dataset objective in the form of Equation 12 with only $\mathcal{F}$, $\mathcal{V}$, and $\mathcal{W}$ and terms, the corresponding PDE defined by Equation 14 is known as a diffusion-advection-interaction equation. Certain choices of dataset objectives $\mathcal{F}$, $\mathcal{V}$, and $\mathcal{W}$ recover known PDEs. For example, taking $F(\rho)=\mathcal{F}(\rho)+\mathcal{V}(\rho)$, and $f(t)=t \log t$ the gradient flow of F will be defined by the solution of the Fokker-Planck equation $\partial_t \rho - \Delta \rho - \nabla \cdot (\rho \nabla V)=0$. In dataset space, this equation can be interpreted as the time evolution of a dataset subject to a drift force imposed by the potential function V and a constant-variance diffusion term $(\Delta \rho)$ resulting from the entropy-inducing dataset objective F. Other choices of dataset objective provide the advection equation, porous-media equation, and various other diffusion-advection-interaction PDEs.

The PDEs can be described in terms of random variables. Consider a stochastic process $(Z_t)_t$, where each $Z_t \triangleq (\chi_t, \mathcal{Y}_t)$ is a random variable with law $\rho_t \in P(Z)$. Equation 8 is associated with a stochastic differential equation (SDE) on $Z_t$, known as a McKean-Vlasov process according to Equation 15:

$$dZ_t = \phi(Z_t, \rho_t)dt, Z_0 \sim \rho_0 \quad \text{Equation 15}$$

For $$\phi(Z_t, \rho_t) = -\nabla \frac{\partial F}{\partial \rho}(\rho_t)(Z_t).$$

Equation 15 can be interpreted as a trajectory of a particle, with initial position $\rho_0$ and moving according to a potential function that captures its intrinsic dynamics and interactions with other particles, all driven by F. This particle view of the gradient flow lends itself to computational schemes that operate on finitely many samples. The process defined by Equation 15 is defined on Z (a finite-dimensional space) rather than on the infinite-dimensional P(Z), which makes it amendable to computation.

Numerical approaches to solve SDEs, like that defined in Equation 15, can include discretization, such as with a forward Euler scheme defined in Equation 16:

$$Z_{t+1}=Z_t - \gamma \nabla F_{\alpha t}(Z_t), Z_0 \sim \rho_0 \quad \text{Equation 16}$$

Computationally, this discretized scheme is approximated by a system of particles that evolve simultaneously. Starting from $\rho_0 \approx \Sigma_{i=1}^N \rho_i \delta_{z_i(0)}$, each particle $z^{(i)}$ is evolved according to Equation 16, resulting in a system of n updates as in Equation 17:

$$z_{t+1}^{(i)}=z_t^{(i)}-\gamma \nabla_z (i)F(z_t^{(i)}) \forall i=1,\ldots,n \quad \text{Equation 17}$$

Then, $\rho_t$ can be approximated as $\rho_{N,t}=\Sigma_{i=1}^N \rho_i \delta_{z_t^i}$, where $\rho_{N,t}$ is a gradient flow flor F. For well-behaved dataset objectives, this flow inherits all convexity and stability properties of the exact dataset objective, and $\rho_{N,t}(x) \to \rho_t(x)$.

The distance dataset objective can be defined as $T_\beta(\rho) \triangleq \text{OTDD}(\rho, \beta)$, where $\beta$ is a (fixed) target dataset distribution. Various applications, such as dataset interpolation or sample generation for transfer learning, can be modelled with this dataset objective. The distance dataset objective can be combined with other dataset objectives to "shape" the distribution of interest, $\rho$. The shape can include separation between labels (linear separation), regularity of points in the distribution, size of distribution (e.g., average magnitude, mathematical norm, or the like of samples), or other constraints.

A potential energy dataset objective, $\mathcal{V}(\rho)=\int V(z)d\rho$ can be used to enforce local (per-instance) constraints. For example, a norm of the features of a dataset can be constrained by setting $V(z)=V(x,y)=\|x\|$, or more generally $V(z)=\|Ax-b\|$ for some $A \in \mathbb{R}^{d \times d}$, $b \in \mathbb{R}^d$. These constraints can be enforced per class, such as to have different constraints per class using $V(z)=|(|A_y x-b_y|)|$. In another example, linear separability between the datasets can be enforced using a margin-inducing potential $V(z)=\max\{0, y(x^T w-b)\}$.

An interaction energy potential, $\mathcal{W}(\rho)=\frac{1}{2}\iint W(z-z')d\rho(z)d\rho(z')$ can encode a dataset objective that model's interaction or aggregation between samples in the dataset. A class-repulsion constraint, for example, includes $\mathcal{W}(z-z')=\exp\{-\|x-x'\|^2$ if $y \neq y'$ and 0 otherwise. This encourages class separation by penalizing pairs $(z,z')$ that have different labels but similar features.

The internal energy dataset objective $\mathcal{F}(\rho)=\int f(\rho(z))dz$ requires an explicit density $\rho(z)$ in closed form. An entropy term can be used in the dataset objective by taking $f(t)=t \log t$.

Some practical, implementation considerations regarding OTDD and gradient flow applications are provided. In determining the differentiable dataset distance, such as OTDD. Difficulty in determining OTDD is provided from the discrete nature of labels y. Recall that each point (particle) is a pair of features x and a corresponding label y denoted as (x,y), where $x \in \mathbb{R}^r$ (a continuous r-dimensional space) and $y \in \{c_i, \ldots, c_K\}$ (a discrete space). The OTDD discussion about Equation 6 provides an alternative representation of the features and label pairs as (x, v) where $v \in P(\chi)$ is a measure over $\chi$ associated with the label y.

One way to implement this is to backpropagate gradients into $x^{(i)}$, perform a gradient step adjustment on those features, then compute means and covariances (and as a consequence, the probabilistic representation of labels $v_y$). Formally, this is represented as:

$$x_{t+1}^i=x_t^i - \tau \nabla_{x^i} F(\rho)\ i \in \{1,\ldots,n\}$$

$$\mu_{t+1}^j=\text{mean}(\{x_{t+1}^i\}_{i:y_i=j})\ j \in \{1,\ldots,k\}$$

$$E_{t+1}^j=\text{cov}(\{x_{t+1}^i\}_{i:y_i=j})\ j \in \{1,\ldots,k\}$$

$$v_{t+1}^j=\mathcal{N}(\mu_{t+1}^j, \Sigma_{t+1}^j)\ j \in \{1,\ldots,k\}$$

Note that the mean and covariance evolve in response to a gradient change on the samples. In this formulation the gradient does not operate directly on the mean and covariance. This formulation is sometimes called a feature-driven approach. A possible drawback of this approach is that the label assignments are fixed through time. This can be acceptable is the first dataset and the target dataset include the same number of labels. A joint-drive fixed-label formulation can perform independent gradient updates on the mean and covariance while keeping the label assignments fixed. Formally, the joint-driven fixed-label update is represented as:

$$x_{t+1}^i = x_t^i - \tau \nabla_{x^i} F(\rho) \ i \in \{1, \ldots, n\}$$

$$\mu_{t+1}^j = \mu_t^j - \tau \nabla_{\mu^j} F(\rho) \ j \in \{1, \ldots, k\}$$

$$\Sigma_{t+1}^j = \Sigma_t^j - \tau \nabla_{\Sigma^j} F(\rho) \ j \in \{1, \ldots, k\}$$

$$v_{t+1}^j = \mathcal{N}(\mu_{t+1}^j, \Sigma_{t+1}^j) \ j \in \{1, \ldots, k\}$$

Relaxing a constraint that label assignments are fixed through the gradient flow process can include evolving a distribution associated with each point individually. The distributions for each label can be decoupled yielding a distribution per sample, rather than a distribution per class. Each sample (sometimes called a particle) can then be evolved independently and the labels can be recovered, such as by clustering after evolution. This is called a joint-driven variable-label formulation. Formally, the joint-driven, variable-label update is represented as:

$$x_{t+1}^i = x_t^i - \tau \nabla_{x^i} F(\rho) \ i \in \{1, \ldots, n\}$$

$$\mu_{t+1}^i = \mu_t^i - \tau \nabla_{\mu^i} F(\rho) \ i \in \{1, \ldots, n\}$$

$$\Sigma_{t+1}^i = \Sigma_t^i - \tau \nabla_{\Sigma^i} F(\rho) \ i \in \{1, \ldots, n\}$$

$$v_{t+1}^i = \mathcal{N}(\mu_{t+1}^i, \Sigma_{t+1}^i) \ i \in \{1, \ldots, n\}$$

To recover the labels, a clustering technique (e.g., a non-parametric clustering technique that does not require specifying the number of clusters) can operate on pairs of the mean and covariance ($\mu_i$, $\Sigma_i$).

Some practical implementation considerations are now provided for the dataset objective $F(\rho)$. A first variation of a potential energy dataset objective is a scalar-valued function, so the first variation can be computed using automatic differentiation. A first variation of interaction energy dataset objectives can be approximated as an empirical expectation over samples. A first variation of an internal energy dataset objective can be determined if the density is available and can be back-propagated. In such circumstances, automatic differentiation can be used to determine the gradient.

The step-size of the gradient application can be fixed or variable. To accelerate convergence and account for potential violations in a convexity assumption in the dataset objective, an adaptive step-size technique like stochastic gradient descent (SGD) with momentum, ADAM, or ADAGARD can be used. Such adaptive step-sizes aid in escaping local minima.

Figure 5:
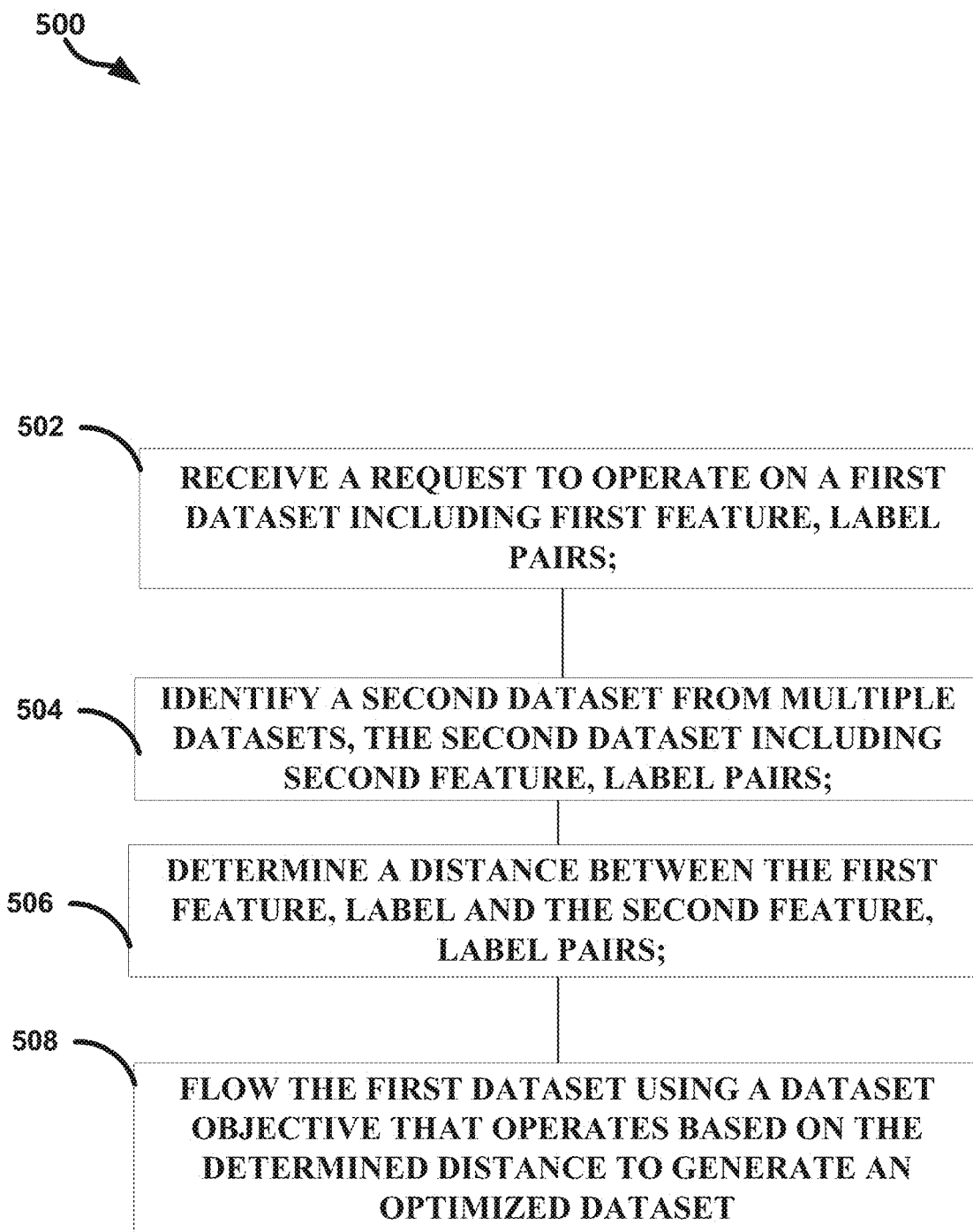
FIG. 5 illustrates, by way of example, a flow diagram of another embodiment of a technique for dataset optimization.

FIG. 5 illustrates, by way of example, a diagram of an embodiment of a method 500 for dataset optimization. The method 500 as illustrated includes receiving a request to operate on a first dataset including first feature, label pairs, at operation 502; identifying a second dataset from multiple datasets, the second dataset including second feature, label pairs, at operation 504; determining a distance between the first feature, label and the second feature, label pairs, at operation 506; and flowing the first dataset using a dataset objective that operates based on the determined distance to generate an optimized dataset, at operation 508.

The method 500 can further include, wherein each label is represented by a probability distribution of features mapped to the label in the distance determination. The method 500 can further include operating a first ML model trained on the second dataset with the altered first dataset as input to provide a result. The method 500 can further include keeping the first ML model static during training.

The method 500 can further include training a second ML model using the altered first dataset and at least a portion of the second dataset. The method 500 can further include providing the altered first dataset. The method 500 can further include, wherein determining the distance includes determining a differentiable distance. The method 500 can further include, wherein the distance includes an optimal transport distance (OTD). The method 500 can further include, wherein determining the OTD includes determining a distance between respective labels of the first and second datasets based on features of datapoints of the first and second datasets associated with the respective labels.

The method 500 can further include, wherein flowing the first dataset includes determining gradients of the dataset objective with respect to the first dataset and flowing the first dataset further includes updating the first dataset using the determined gradient. The method 500 can further include, wherein the dataset objective includes at least one of minimizing internal energy, minimizing potential energy, minimizing distance, or minimizing interaction energy.

The method 500 can further include, wherein the dataset objective includes minimizing distance between feature, label pairs. The method 500 can further include, wherein updating the first dataset using the determined gradient includes using a feature-driven update, joint-driven fixed-label update, or a joint-driven variable-label update. The method 500 can further include, wherein the first dataset and the second dataset include image datasets or the first dataset and the second dataset include natural language processing (NLP) datasets.

"Flows", as used herein, means iterative application and update of features (and sometimes labels) of data samples using a gradient descent technique constrained by an objective. Some experimental results using embodiments are now provided. The experimental results regard flowing a first dataset ($D_\rho$) towards a second dataset ($D_\beta$) with a functional $\mathcal{F}_\beta(\rho) = \text{OTDD}(D_\rho, D_\beta)$.

Figure 6:
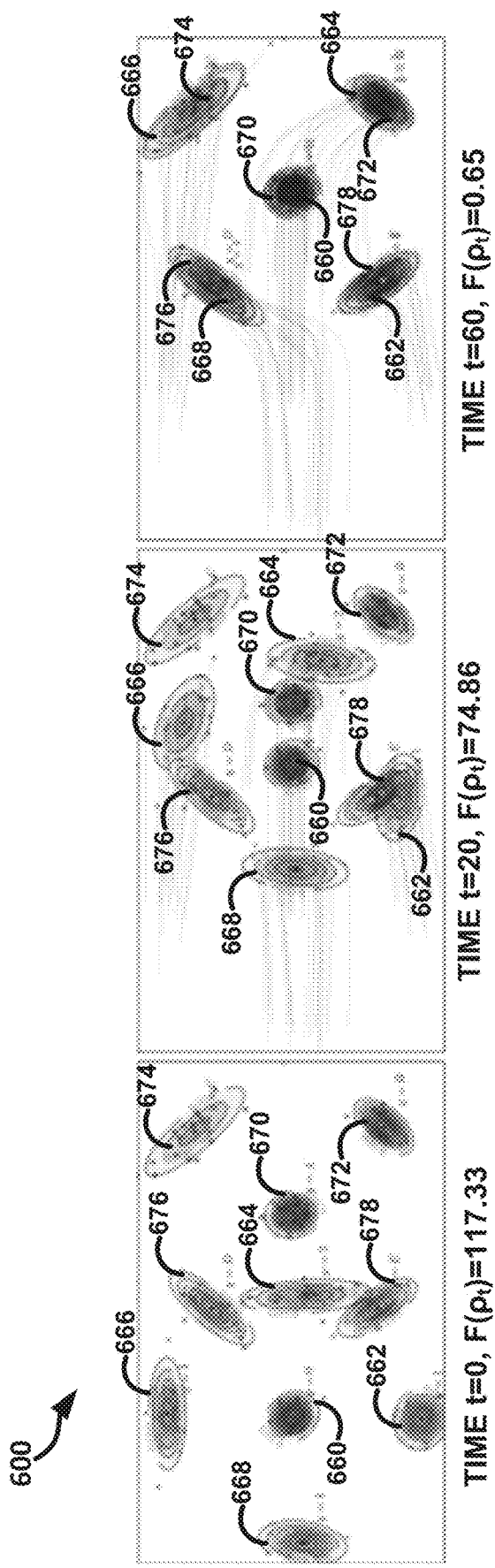
FIG. 6 illustrates, by way of example, a series of diagrams of gradient flows at various time steps.

FIG. 6 illustrates, by way of example, a series of diagrams 600 of gradient flows at various time steps. The example of the gradient flows in FIG. 6 use a joint driven fixed label technique for the gradient flows. In the diagrams 600, there are two datasets. A first dataset includes samples 660 mapped to label "0", samples 662 mapped to label "1", samples 664 mapped to label "2", samples 666 mapped to label "3", and samples 668 mapped to label "4". A second dataset includes samples 670 mapped to label "A", samples 672 mapped to label "B", samples 674 mapped to label "C", samples 676 mapped to label "D", and samples 678 mapped to label "E". As time progresses, the data samples 660 get closer to the data samples 670, the data samples 662 get closer to the data samples 678, the data samples 664 get closer to the data samples 672, the data samples 666 get closer to the data samples 674, and the data samples 668 get closer to the data samples 676.

Figure 7:
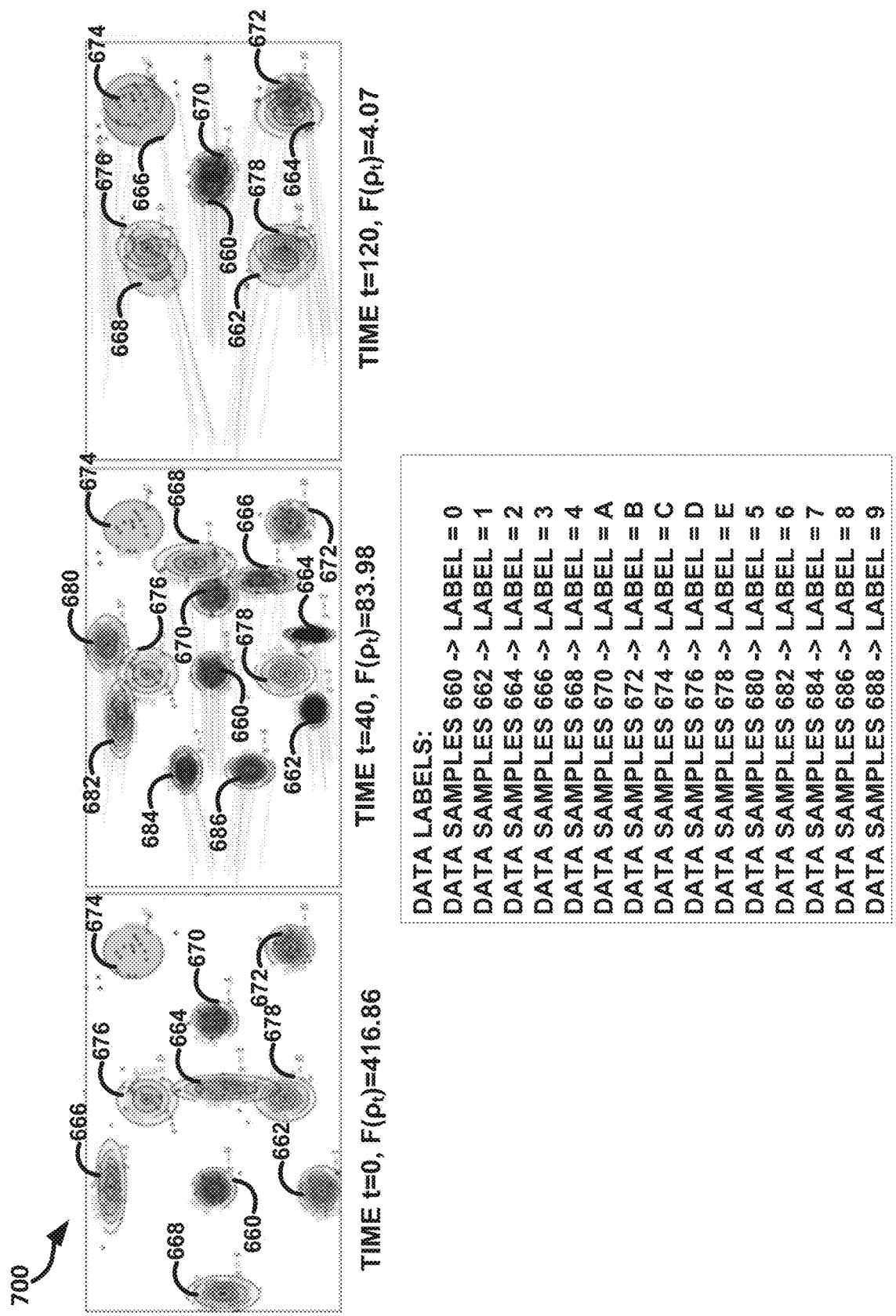
FIG. 7 illustrates, by way of example, another series of diagrams of gradient flows at various time steps.

FIG. 7 illustrates, by way of example, another series of diagrams 700 of gradient flows at various time steps. The example of the gradient flows in FIG. 7 use a joint driven variable label technique for the gradient flows. In the diagrams 700, the two datasets are the same as in FIG. 6, with the first dataset able to be mapped to different labels during the gradient flow process. As time progresses, some of the data samples of the first dataset include labels different from when the flow started. Some of the data samples 680 are mapped to label "5", some of the data samples 682 are mapped to label "6", some of the data samples 684 are mapped to label "7", some of the data samples 686 are mapped to label "8", and some of the samples are mapped to label "9".

Figure 8:
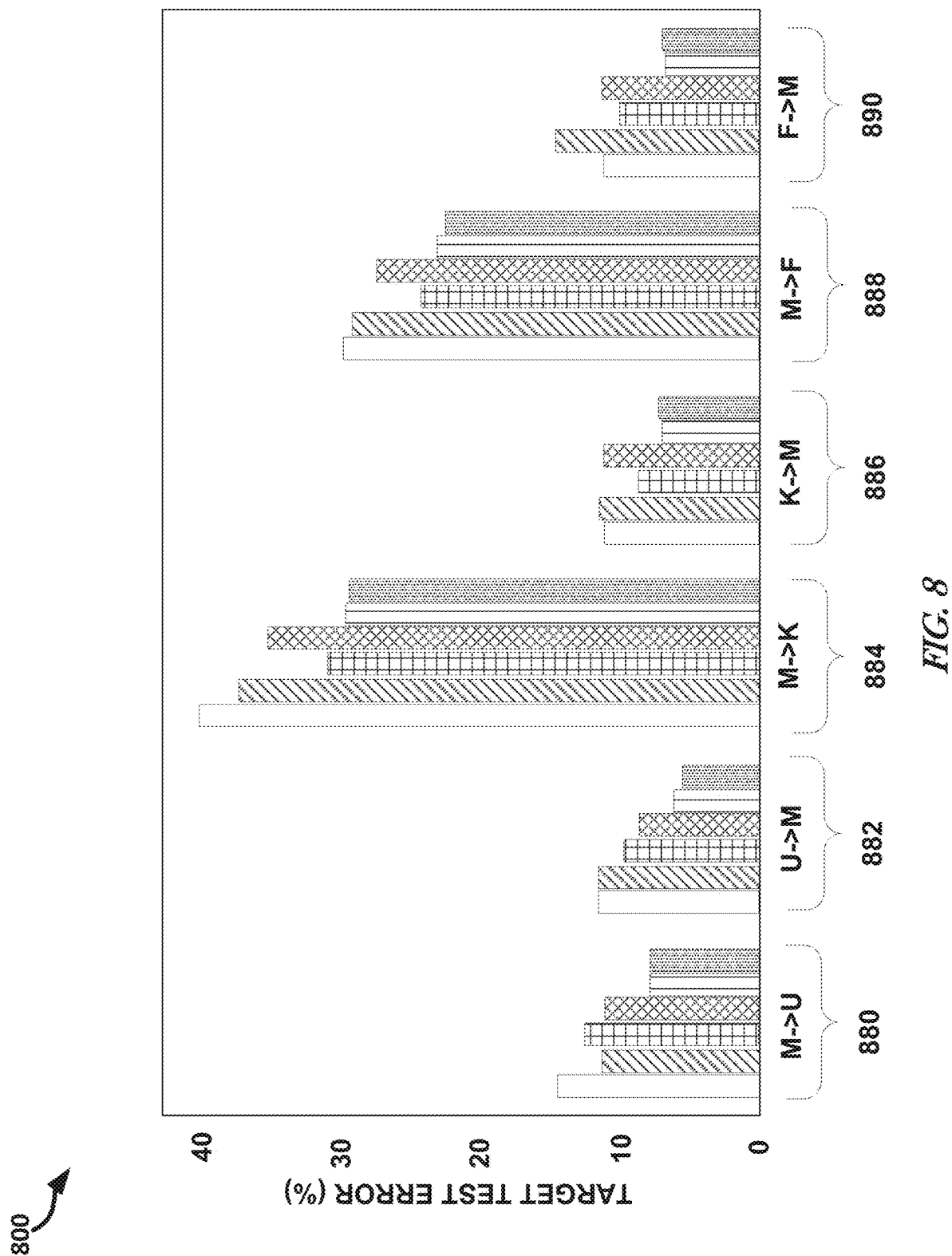
FIG. 8 illustrates, by way of example, bar graphs of error in different techniques for transfer learning using four image classification datasets.

FIG. 8 illustrates, by way of example, bar graphs 800 of error in different techniques for transfer learning using four image classification datasets: MNIST, USPS, fashion-MNIST, AND KMNIST, denoted here as m, u, f, k, respectively. The bar graphs 800 include groups 880, 882, 884, 886, 888, and 890 of 6 bars representing 6 different transfer learning techniques. The bars of each group are described from left to right as: (i) no extra learning, (ii) learning on additional data without modification, (iii) learning on additional data after modification using a neural network (NN) that approximates the gradient flow process, (iv) learning on a final state of additional data flowed towards target dataset, (v) learning on all states of additional data flowed towards target dataset (the state of the additional after each iteration of the flow) and (vi) learning on additional data flowed towards target dataset and additional data after modification using the NN. The group 880 represents transfer learning from MNIST to USPS (an MNIST trained model is further trained using USPS data samples), the group 882 represents transfer learning from USPS to MNIST, the group 884 represents transfer learning from MNIST to KMNIST, the group 886 represents transfer learning from KMNIST to MNIST, the group 888 represents transfer learning from MNIST to fashion-MNIST, the group 890 represents transfer learning from fashion-MNIST to MNIST.

Figure 9:
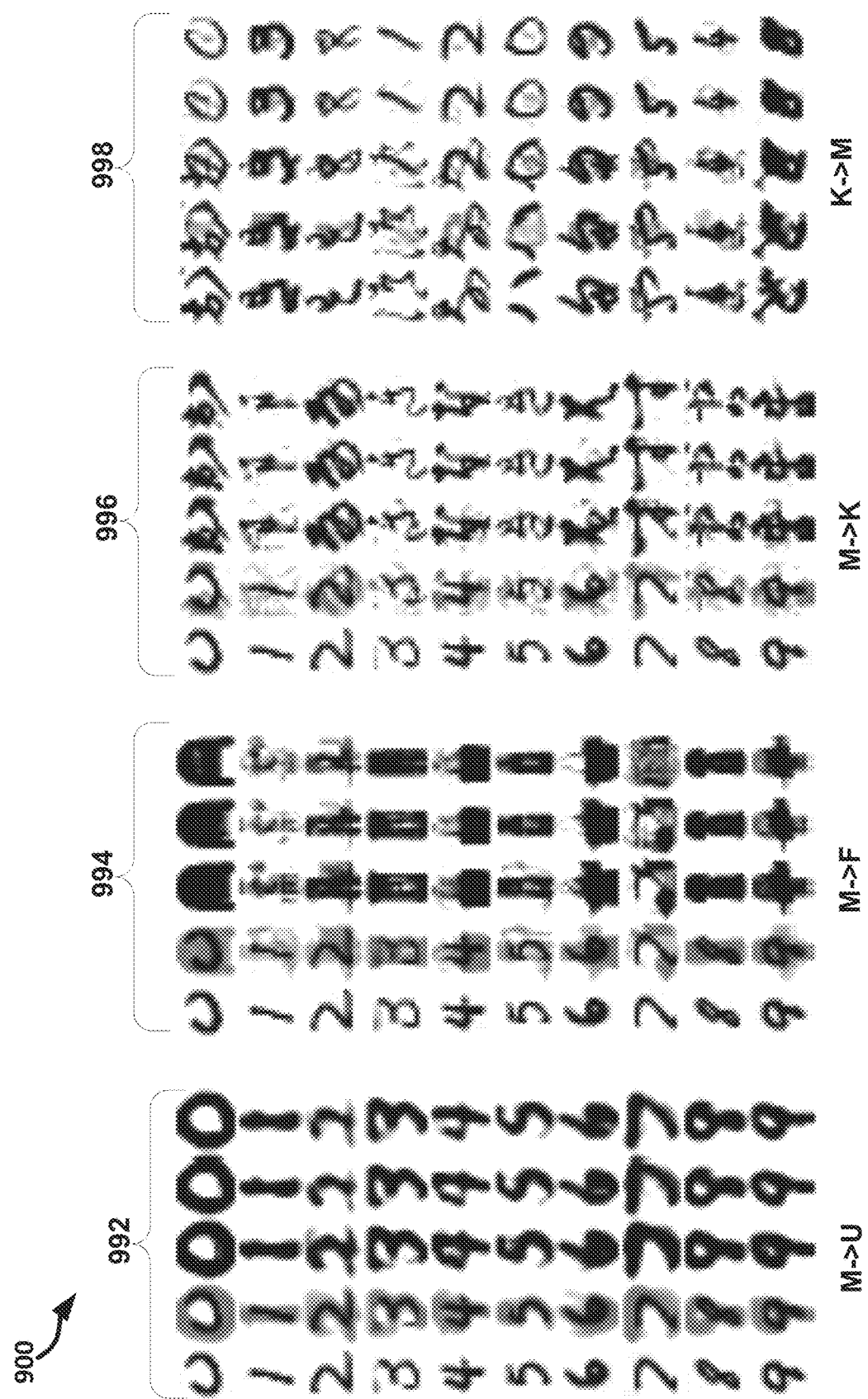
FIG. 9 illustrates, by way of example, a few image series in an embodiment illustrating images at various times during a gradient flow process.

FIG. 9 illustrates, by way of example, a few series images in an embodiment illustrating images at various times during a gradient flow process. In a first series 992, MNIST data samples are flowed towards the USPS dataset, in a second series 994, MNIST data samples are flowed towards the fashion MNIST dataset, in a third series 996, MNIST data samples are flowed towards the KMNIST dataset, and in a fourth series 998, KMNIST data samples are flowed towards the MNIST dataset.

Figure 10:
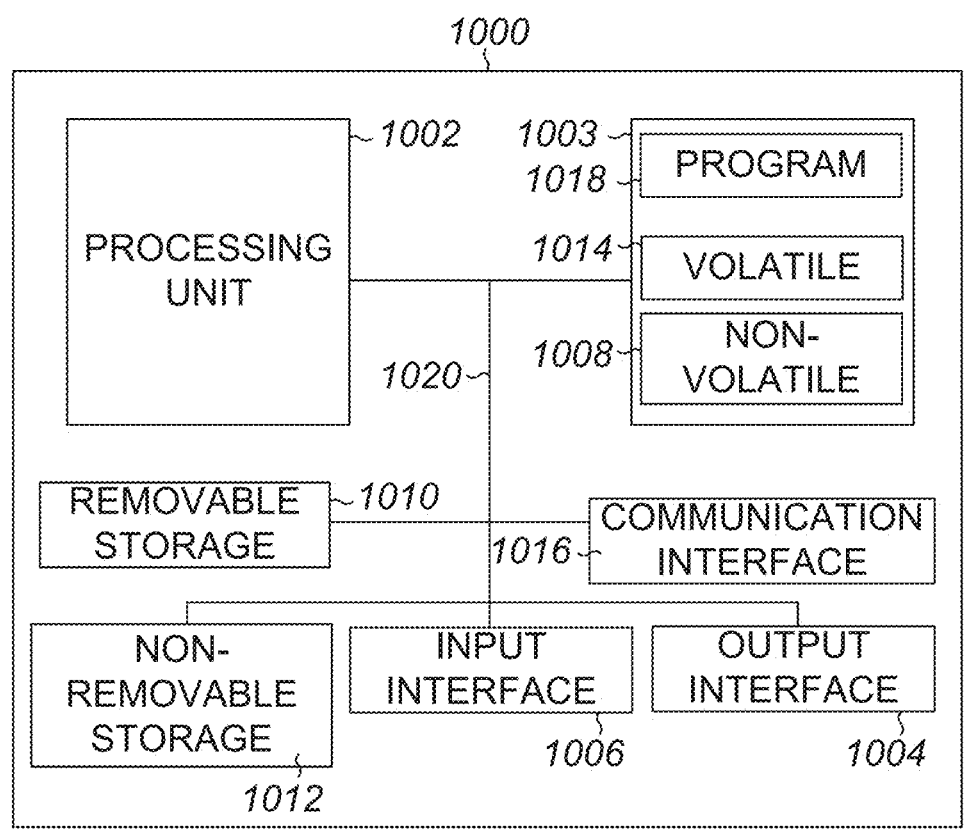
FIG. 10 illustrates, by way of example, a block diagram of an embodiment of a machine (e.g., a computer system) to implement one or more embodiments.

FIG. 10 illustrates, by way of example, a block diagram of an embodiment of a machine 1000 (e.g., a computer system) to implement one or more embodiments. One example machine 1000 (in the form of a computer), may include a processing unit 1002, memory 1003, removable storage 1010, and non-removable storage 1012. Although the example computing device is illustrated and described as machine 1000, the computing device may be in different forms in different embodiments. For example, the computing device may instead be a smartphone, a tablet, smartwatch, or other computing device including the same or similar elements as illustrated and described regarding FIG. 10. Devices such as smartphones, tablets, and smartwatches are generally collectively referred to as mobile devices. Further, although the various data storage elements are illustrated as part of the machine 1000, the storage may also or alternatively include cloud-based storage accessible via a network, such as the Internet.

Memory 1003 may include volatile memory 1014 and non-volatile memory 1008. The machine 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 1000, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 1000. A hard drive, CD-ROM, and RAM are some examples of articles including a non-transitory computer-readable medium such as a storage device. For example, a computer program 1018 may be used to cause processing unit 1002 to perform one or more methods or algorithms described herein.

Additional Notes and Examples

Example 1 includes a computer-implemented method for machine learning (ML) by flowing a dataset towards a target dataset, the method comprising receiving a request to operate on a first dataset including first feature, label pairs, identifying a second dataset from multiple datasets, the second dataset including second feature, label pairs, determining a distance between the first feature, label and the second feature, label pairs, and flowing the first dataset using a dataset objective that operates based on the determined distance to generate an optimized dataset.

In Example 2, Example 1 can further include, wherein each label is represented by a probability distribution of features mapped to the label in the distance determination.

In Example 3, at least one of Examples 1-2 can further include operating a first ML model trained on the second dataset with the altered first dataset as input to provide a result, In Example 4, at least one of Examples 1-3 can further include training a second ML model using the altered first dataset and at least a portion of the second dataset.

In Example 5, at least one of Examples 1-4 can further include providing the altered first dataset.

In Example 6, at least one of Examples 3-5 can further include keeping the first ML model static during training.

In Example 7 at least one of Examples 1-6 can further include, wherein determining the distance includes determining a differentiable distance.

In Example 8, Example 7 can further include, wherein the distance includes an optimal transport distance (OTD).

In Example 9, Example 8 can further include, wherein determining the OTD includes determining a distance between respective labels of the first and second datasets based on features of datapoints of the first and second datasets associated with the respective labels.

In Example 10, at least one of Examples 1-9 can further include, wherein flowing the first dataset includes determining gradients of the dataset objective with respect to the first dataset and flowing the first dataset further includes updating the first dataset using the determined gradient.

In Example 11, at least one of Examples 1-10 can further include, wherein the dataset objective includes at least one of minimizing internal energy, minimizing potential energy, minimizing distance, or minimizing interaction energy.

In Example 12, Example 11 can further include, wherein the dataset objective includes minimizing distance between feature, label pairs.

In Example 13, Example 10 can further include, wherein updating the first dataset using the determined gradient includes using a feature-driven update, joint-driven fixed-label update, or a joint-driven variable-label update.

In Example 14, at least one of Examples 1-13 can further include, wherein the first dataset and the second dataset include image datasets or the first dataset and the second dataset include natural language processing (NLP) datasets.

Example 15 can include a system including a memory and processing circuitry configured to implement the method of at least one of Examples 1-14.

Example 16 can include a machine-readable medium including instructions that, when executed by a machine, cause the machine to perform the method of at least one of Examples 1-14.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method for machine learning (ML) by flowing a dataset towards a target dataset, the method comprising:
   receiving a request to alter a first dataset, the first dataset including first (features, label) pairs;
   identifying or receiving a second dataset, the second dataset including second (features, label) pairs with one or more different features and one or more different labels than the first (features, label) pairs;
   determining, for each label of the first and second datasets, a probability distribution of features mapped to a corresponding label of the first and second (features, label) pairs;
   substituting the probability distribution of features mapped to the corresponding label for the corresponding label in the first and second (features, label) pairs resulting in first and second (features, probability distribution of the features) pairs;
   determining a distance between the first probability distribution of the features and the second probability distribution of the features; and
   altering the features of the first dataset using a dataset objective that operates based on the determined distance to generate an optimized first dataset that is flowed to the domain of the second dataset.

2. The computer-implemented method of claim 1, further comprising operating a first ML model trained on the second dataset with the altered first dataset as input to provide a result.

3. The computer-implemented method of claim 1, further comprising training a second ML model using the altered first dataset and at least a portion of the second dataset.

4. The computer-implemented method of claim 1 further comprising providing the altered first dataset.

5. The computer-implemented method of claim 2, further comprising keeping the first ML model static during training.

6. The computer-implemented method of claim 1, wherein determining the distance includes determining a differentiable distance.

7. The computer-implemented method of claim 6, wherein the distance includes an optimal transport distance (OTD).

8. The computer-implemented method of claim 7, wherein determining the OTD includes determining a distance between respective labels of the first and second datasets based on features of datapoints of the first and second datasets associated with the respective labels.

9. The computer-implemented method of claim 8, wherein flowing the first dataset includes determining gradients of the dataset objective with respect to the second dataset and flowing the first dataset further includes updating the first dataset using the determined gradient.

10. The computer-implemented method of claim 9, wherein the dataset objective includes at least one of minimizing internal energy, minimizing potential energy, minimizing distance, or minimizing interaction energy.

11. The computer-implemented method of claim 10, wherein the dataset objective includes minimizing distance between feature, label pairs.

12. The computer-implemented method of claim 10, wherein updating the first dataset using the determined gradient includes using a feature-driven update, joint-driven fixed-label update, or a joint-driven variable-label update.

13. The computer-implemented method of claim 1, wherein the first dataset and the second dataset include image datasets or the first dataset and the second dataset include natural language processing (NLP) datasets.

14. A non-transitory machine-readable medium including instructions that, when executed by a machine, cause the machine to perform operations for machine learning (ML) by flowing a dataset towards a target dataset, the operations comprising:
   receiving a request to alter a first dataset, the first dataset including first (features, label) pairs;
   identifying or receiving a second dataset, the second dataset including second (features, label) pairs with one or more different features and one or more different labels than the first (features, label) pairs;
   determining, for each label of the first and second datasets, a probability distribution of features mapped to a corresponding label of the first and second (features, label) pairs;
   substituting the probability distribution of features mapped to the corresponding label for the corresponding label in the first and second (features, label) pairs resulting in first and second (features, probability distribution of the features) pairs;

determining a distance between the first probability distribution of the features and the second probability distribution of the features; and altering the features of the first dataset using a dataset objective that operates based on the determined distance to generate an optimized first dataset that is flowed to the domain of the second dataset.

15. The machine-readable medium of claim 14, wherein the operations further comprise (i) operating a first ML model trained on the second dataset with the altered first dataset as input to provide a result, (ii) training a second ML model using the altered first dataset and at least a portion of the second dataset, or (iii) providing the altered first dataset.

16. A system for supervised machine learning (ML) that flows a dataset towards a target dataset, the system comprising:

a memory including instructions stored thereon;

processing circuitry coupled to the memory, the instructions, when executed by the processing circuitry configure the processing circuitry to:

receive a request to operate on a first dataset, the first dataset including first (features, label) pairs;

identify or receive a second dataset from multiple datasets, the second dataset including second (features, label) pairs with one or more different features and one or more different labels than the first (features, label) pairs;

determining, for each label of the first and second datasets, a probability distribution of features mapped to a corresponding label of the first and second (features, label) pairs;

substituting the probability distribution of features mapped to the corresponding label for the corresponding label in the first and second (features, label) pairs resulting in first and second (features, probability distribution of the features) pairs;

determine a distance between the first probability distribution of the features and the second probability distribution of the features; and altering the features of the first dataset using a dataset objective that operates based on the determined distance to generate an optimized first dataset that is flowed to the domain of the second dataset.

17. The system of claim 16, wherein the processing circuitry is further to (i) operate a first ML model trained on the second dataset with the altered first dataset as input to provide a result, (ii) train a second ML model using the altered first dataset and at least a portion of the second dataset, or (iii) provide the altered first dataset.

* * * * *